(12) United States Patent
English et al.

(10) Patent No.: US 10,896,230 B2
(45) Date of Patent: Jan. 19, 2021

(54) SHARING AND COLLABORATION OF SEARCH RESULTS IN A TRAVEL SEARCH ENGINE

(71) Applicant: Kayak Software Corporation, Stamford, CT (US)

(72) Inventors: Paul M. English, Arlington, MA (US); Derek M. Young, Wayland, MA (US); Jeff A. Rago, Lexington, MA (US); Lincoln D. Jackson, Newburyport, MA (US); Paul D. Schwenk, Stow, MA (US); Giorgos C. Zacharia, Winchester, MA (US)

(73) Assignee: Kayak Software Corporation, Stamford, CT (US)

( * ) Notice: Subject to any disclaimer, the term of this patent is extended or adjusted under 35 U.S.C. 154(b) by 122 days.

(21) Appl. No.: 16/372,606

(22) Filed: Apr. 2, 2019

(65) Prior Publication Data
US 2019/0258685 A1 Aug. 22, 2019

Related U.S. Application Data

(63) Continuation of application No. 14/210,807, filed on Mar. 14, 2014, now Pat. No. 10,275,527, which is a continuation of application No. 12/619,447, filed on Nov. 16, 2009, now Pat. No. 8,719,251.

(60) Provisional application No. 61/114,969, filed on Nov. 14, 2008.

(51) Int. Cl.
| | | |
|---|---|---|
| *G06F 16/00* | (2019.01) | |
| *G06F 16/951* | (2019.01) | |
| *G06F 16/954* | (2019.01) | |
| *G06F 16/9032* | (2019.01) | |

(52) U.S. Cl.
CPC ...... *G06F 16/951* (2019.01); *G06F 16/90328* (2019.01); *G06F 16/954* (2019.01)

(58) Field of Classification Search
CPC .................................................... G06F 16/951
See application file for complete search history.

(56) References Cited

U.S. PATENT DOCUMENTS

| | | | |
|---|---|---|---|
| 6,854,010 B1 * | 2/2005 | Christian | G06Q 10/10 709/219 |
| 2002/0091556 A1 | 7/2002 | Fiala et al. | |
| 2005/0021626 A1 | 1/2005 | Prajapat et al. | |
| 2007/0112606 A1 | 5/2007 | Deljo et al. | |

* cited by examiner

*Primary Examiner* — Ajith Jacob
(74) *Attorney, Agent, or Firm* — Banner & Witcoff, Ltd.

(57) ABSTRACT

A travel search engine enables a user to share his or her search results with one or more other users in real time. Each of the users has a common set of search results and any user can select share a specific result within the common set. The remaining results in the common set can be independently filtered and sorted. By selectively sharing various ones of the search results, while being able to separately manipulate the remaining search results, users have access to a common set of potentially mutually acceptable results, but can still individually explore the search results by filtering along different criteria.

20 Claims, 17 Drawing Sheets

SHARING AND COLLABORATION OF SEARCH RESULTS IN A TRAVEL SEARCH ENGINE

CROSS-REFERENCE TO RELATED APPLICATIONS

The present application is a continuation of U.S. patent application Ser. No. 14/210,807 entitled "Sharing and Collaboration of Search Results in a Travel Search Engine" and filed on Mar. 14, 2014, which is a continuation of U.S. patent application Ser. No. 12/619,447 entitled "Sharing and Collaboration of Search Results in a Travel Search Engine" and filed on Nov. 16, 2009, which issued as U.S. Pat. No. 8,719,251 on May 6, 2014, and which claims the benefit of U.S. Provisional Pat. App. No. 61/114,969 filed on Nov. 14, 2008, each of which is incorporated by reference herein in its entirety.

BACKGROUND OF THE INVENTION

1. Field of the Invention

This invention pertains in general to a travel search engine and in particular to sharing search results with one or more users.

2. Description of the Related Art

Generally, a travel search engine is a computer system that is accessible over the Internet and that is configured to receive from users search requests for travel reservations. Travel reservations include reservations for flights, accommodations (e.g., hotels), transportation (e.g., car rentals) cruises, and any other aspect of a travel experience for which reservations are generally offered. A travel search engine queries multiple travel related websites (e.g. specific travel providers like American Airlines), search engines (e.g., Travelocity, Orbitz), and other sources for specific travel reservation information as requested by a user. The travel search engine returns to the user integrated search results from the different sources queried.

In many cases two (or more users) want to travel together, for example, take the same flight, stay at the same hotel, etc. In conventional travel search engines, a user's search results are separate from any other user's search results. Thus, users who are travelling together (e.g., friends, spouses, co-workers), but working at different computers, would have to conduct the same search of a travel search engine (e.g., input the same origin, destination city, dates of travel, etc.) and then consult with each other by telephone or other means in order to plan their trip. If one person finds a travel reservation of interest, she has to tell the other traveler to look for that same search result on their screen. This process is inconvenient. In sum, conventional search engines do not allow one or more users to share and collaborate on their search results.

BRIEF SUMMARY OF THE INVENTION

A travel search engine enables a user to share his or her search results with one or more other users in real time. Each of the users can see a common set of search results, and selectively identify specific results to share with the one or more other users. The remaining results can be independently filtered and sorted. At anytime the user can select to share specific filtered and sorted search results. By selectively sharing various ones of the search results, while being able to separately manipulate the remaining search results, users have access to a common set of potentially mutually acceptable results, but can still individually explore the search results by filtering and sorting along different preferences. For example, one user can filter the results by travel provider while the other user filters by time of departure.

BRIEF DESCRIPTION OF THE DRAWINGS

FIGS. 1-8 are examples of a usage scenario for a travel search engine sharing search results according to one embodiment.

FIGS. 9 and 10 are examples of a travel search engine sharing search results for hotel reservations according to one embodiment.

DETAILED DESCRIPTION

I. Overview of Sharing and Collaboration of Search Results

FIGS. 1-8 are examples of a usage scenario for a travel search engine sharing search results according to one embodiment. The scenario is described with respect to a number of screen shots of a client device used by a user to communicate with the travel search engine. For this example, assume User A is looking to purchase a travel reservation (flight, hotel, etc), and she consults in real-time with User B. User B could be a spouse, friend or business colleague. User B might be traveling with User A, or, might just be consulting on the decision for other reasons. For example, User A might be purchasing travel reservations to visit User B. Or one of these users could be a remote travel agent or travel company customer service agent who is using the travel search engine to allow their client to look at real-time options from his own computer. The example described here is with two users, but search collaboration in the travel search engine can be used to share any particular search session with many users at once.

Figure 1:
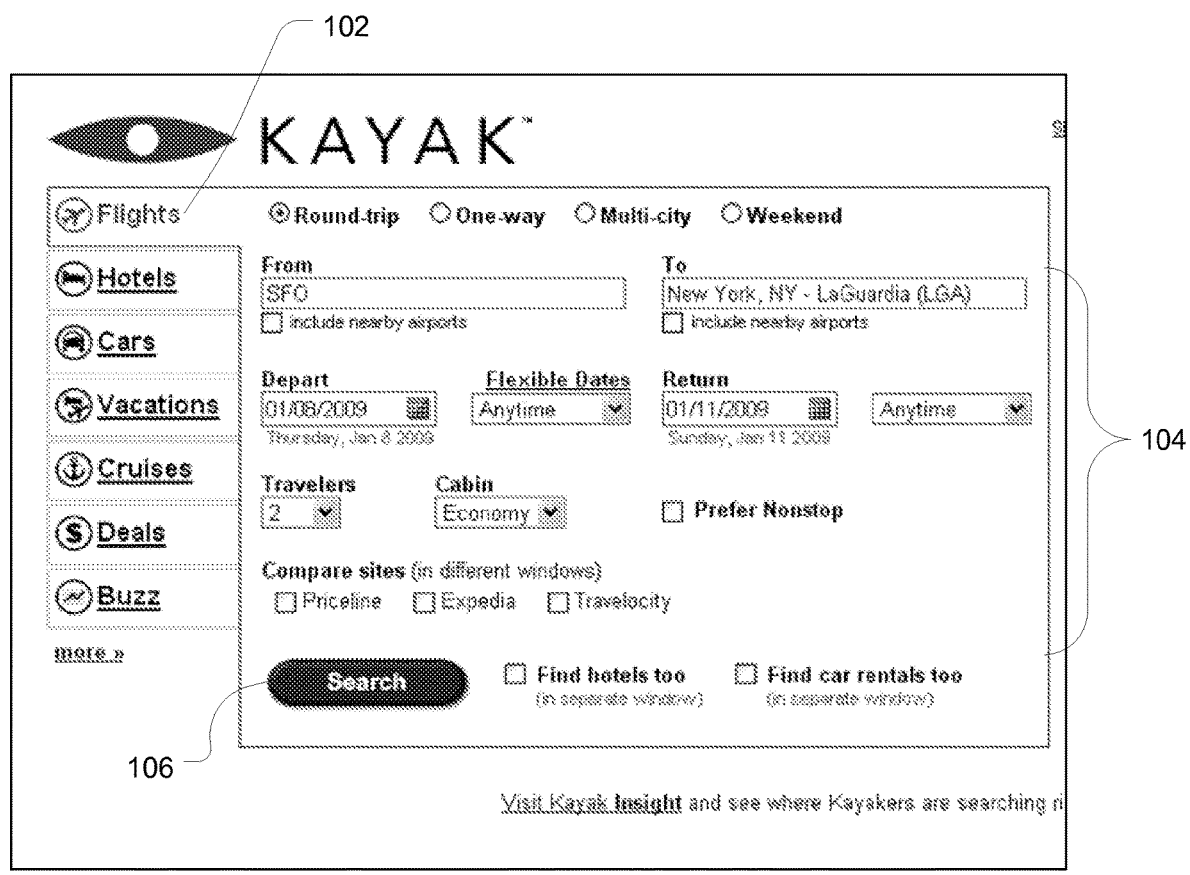

From User A's client device, User A access the travel search engine, such as Kayak (www.kayak.com), via the Internet, and selects a type of travel reservation to search—flights, hotels, rental cars, cruises, vacation packages, etc. In FIG. 1, User A has selected the flights tab 102 in order to conduct a search for flight reservations. User A then inputs the initial search parameters in section 104. The parameters entered in section 104 may include dates of travel, destination, number of travelers, requested class of service, etc. In FIG. 1, User A has input an origin as the airport code "SFO" (though a city name could be used as well) and a destination of New York, LaGuardia airport, along with the departure date (Jan. 8, 2009), return date (Jan. 11, 2009), time of departure and return (anytime), number of travelers (2), class of service (Economy), preference of non-stop (none). After the parameters are input, User A selects the "Search" button 106. The search parameters are transmitted to the travel search engine as a search request.

The travel search engine receives the search parameters, and initiates a search session for the request. The travel search engine associates an identifier with the search session, which is referred to as the session ID. Further, the travel search engine creates a separate session state for User A. User A's separate session state will maintain the state of the search for User A, as well as any filtering/sorting/preferences of User A.

The travel search engine evaluates the search parameters (and optionally, user's past behavior), and initiates one or more queries of travel information sources to obtain search results from the sources. A travel information source is any entity that is capable of providing the travel search engine with a travel related search result. A travel information source may be, for example, a travel related website (e.g., website of a travel provider like American Airlines), a search engine (e.g., Travelocity, Orbitz), or a database storing travel information.

The travel search engine receives search results from the queried travel information sources, and selects from those search results (which could be thousands or more) a set of results that best fit the current user's search parameters. The selected set of search results is referred to as general search results or general search result set. The general search results may be the lowest cost results, or results selected based on User A's past behavior or other preferences.

Figure 2:
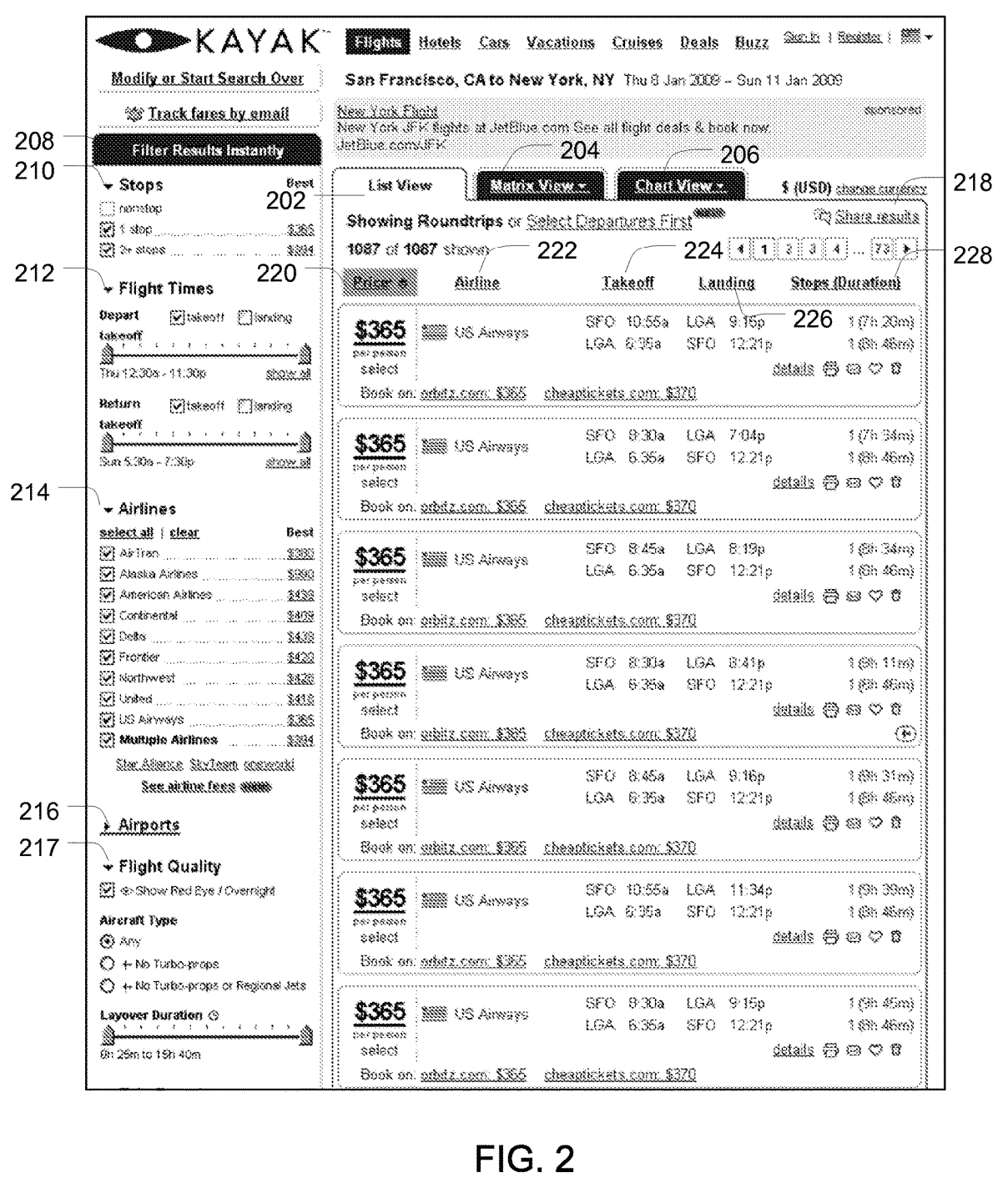

The travel search engine includes the general search results in User A's separate session state. The travel search engine transmits the general search results to User A's client. The client's browser displays the general search results to User A. FIG. 2 illustrates a set of general search results for the search parameters input in FIG. 1, as would be displayed by User's A browser. The general search results in FIG. 2 can be shown in a list view by selecting tab 202, a matrix view by selecting tab 204, or a chart view by selecting tab 206.

User A can optionally sort or filter the displayed results. Filtering is achieved by the user selecting or manipulating the subheadings on the left side of the screen under the "Filter Results Instantly" header 208. The subheadings allow filtering by stops (subheading 210), flight times (subheading 212), airlines (subheading 214), airports (subheading 216), flight quality (subheading 217), and the like. Sorting is achieved by the user selecting one or more of the headings above the general search results. The headings allow for sorting the general search results by price (heading 220), airline (heading 222), takeoff times (heading 224), landing times (heading 226), and stops (heading 228). Sorting or filtering preferences selected by User A are maintained in User A's separate session state.

With the displayed search results, a "Share" control button or link is included. The Share control allows a user to share the general search results with one or more other users. In FIG. 2, a "Share results" link 218 in the upper right corner of the list view is the Share control. User A can click the "Share results" link 218 to start the collaboration process of sharing the general search results. In response to User A clicking on the "Share results" link 218, the search results page is updated to include a form field to receive an input from User A of the email address of another user with whom the results are to be shared.

Figure 3:
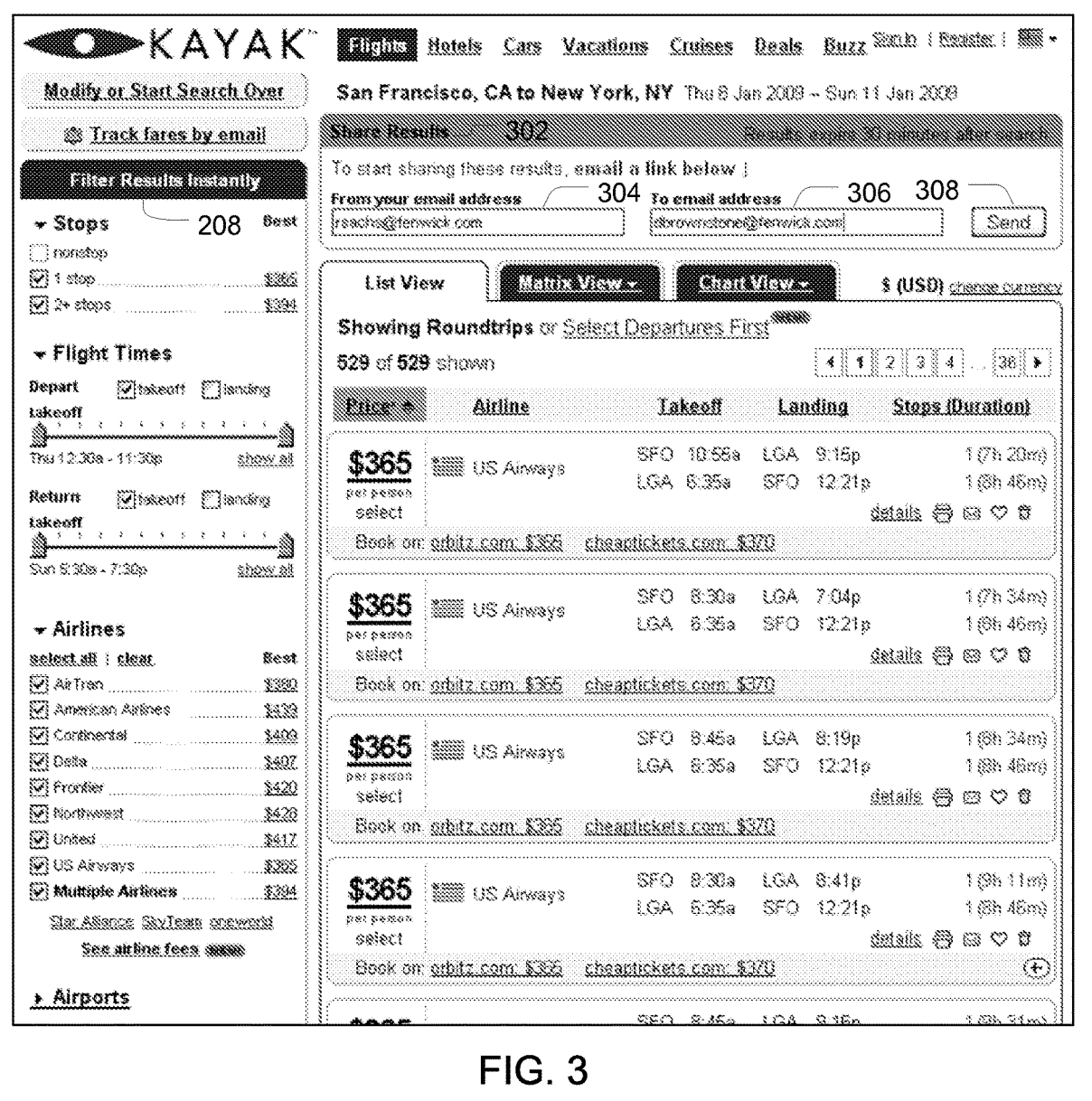

FIG. 3 illustrates an example of this updated page. A Share Results panel 302 is now displayed to User A. In the panel 302, User A enters his email address in field 304. In this example, User A entered "rsachs@fenwick.com" as his email address. Further, User A enters the email address of User B into field 306. User B is the user with whom User A wishes to share the general search results with. In this example, User A entered "drownstone@fenwick.com" as the email address of User B. When User A selects the send button 308, the travel search engine sends an email to User B at the address included in field 306. The email sent to User B includes a Uniform Resource Locator (URL) that provides access to the general search results.

Figure 4:
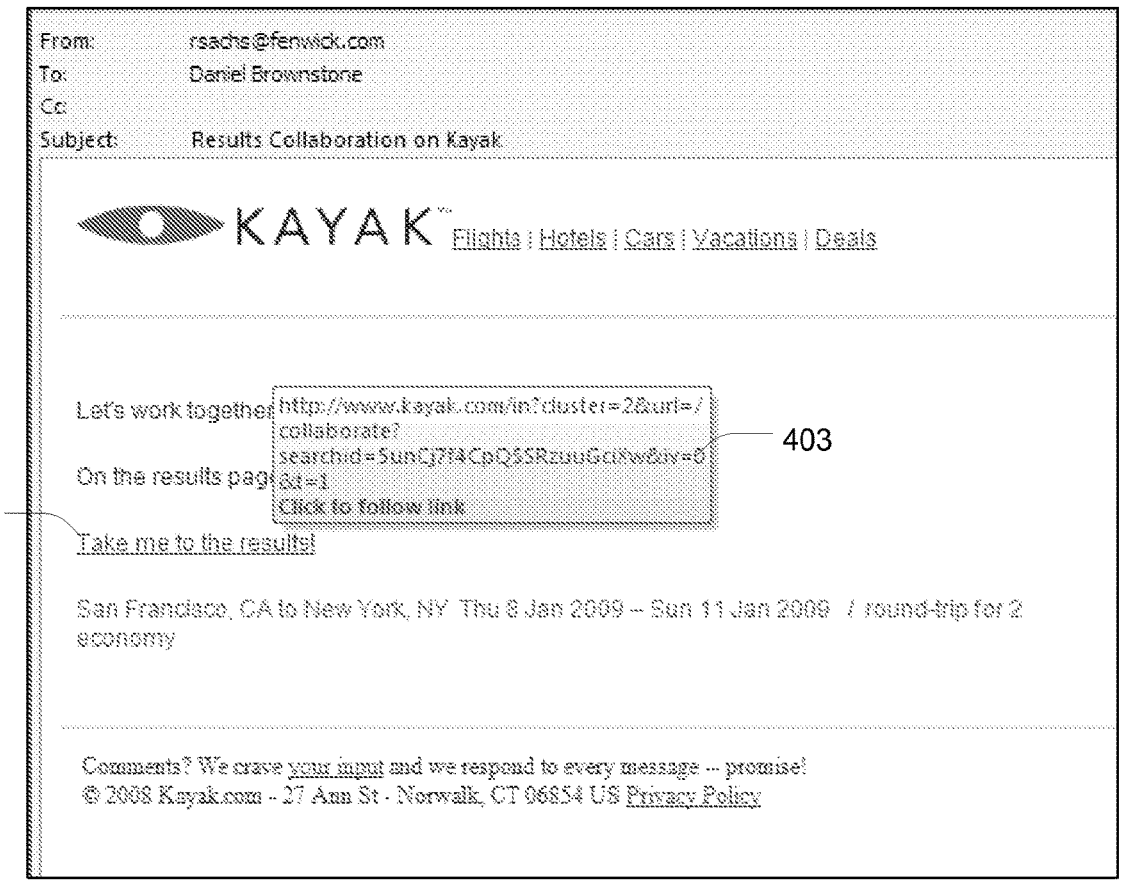

FIG. 4 illustrates an email received by User B, with a link "Take me to the results!" 402. The link 402 (based on the URL sent by User A) contains the search session ID 403 for the search session that User A is currently in. Clicking on the link 402 opens a browser window on User's B client device. The browser transmits the session ID to the travel search engine. The travel search engine creates a separate session state for User B. The travel search engine couples User B's separate session state with User A's separate session state, so that the general search results are now shared. The travel search engine creates a webpage for User B with the current general search results, and transmits webpage to User B's client. User B will see the same results as those displayed to User A. Initially, the search results displayed to User B will be filtered and sorted the same as those search results displayed to User A.

Figures 5A, 5B:
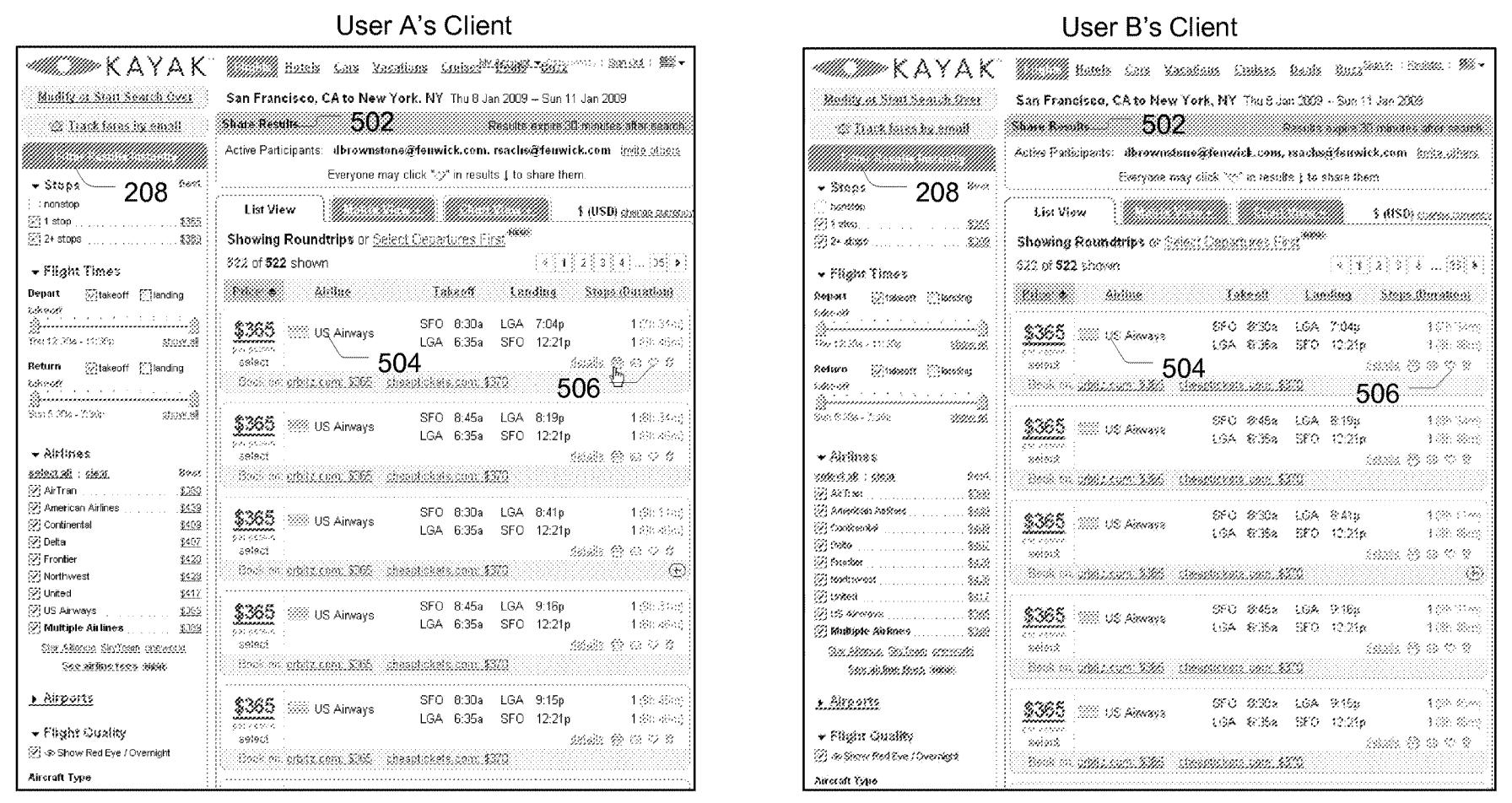

FIG. 5A illustrates the general search results on User A's client, and FIG. 5B illustrates the same results on User B's client. Note that User B did not have to conduct a search to obtain the same results as User A. Also, the "Share Results" panel 502 in FIGS. 5A and 5B lists the user names or email addresses of the currently active participants that are sharing the results.

There are alternative ways in which User A can enable User B to access the general search results. First, User A can copy the current URL from his browser's address bar or receive a URL from the travel search engine and paste that URL into a new or existing chat window with User B. This could be any chat program, such as a third party chat client such AIM, Yahoo Messenger, MSN Messenger, Skype, Pidgin, etc., or a chat client integrated into the travel search engine interface. Similarly, User A could transmit the URL by email, text message, or other messaging means. User B would receive the URL, and paste the URL into User B's browser window. The general search results would be loaded on User B's client in the same manner.

Second, rather than transmit the entire URL, the travel search engine can provide User A with a short unique ID, such as a six to eight digit and/or letter combination, which User A would then transmit to User B for example by any of the foregoing messaging means, or by telephone. This is useful where User B has telephone access to User A, but does not have email or other types of access. In this embodiment, User B access a webpage on the travel search engine that is configured to receive the unique ID (e.g. www.kayak.com/share), and enters the ID into this share webpage. Upon User B entering the ID, the general search results would be loaded on User B's client.

As before, each user can optionally further refine the results on their own client devices, using any of the filtering or sorting controls provided by the travel search engine. These filtering and sorting controls are search specific and may include price, departure/arrival times, trip duration, number of stops, airline, airport, aircraft type, type of flight, accommodation rating, distance from selected location, amenities, brand of accommodation, type of accommodation. For example, User B may decide to show only non-stop flights, or to only consider hotels with a restaurant. Each filter or sort option acted upon by a user changes only that user's general search results, which are held in the user's separate session state.

Either before or after such a refinement, either user can select one or more results to share with the other user(s). Each search result listing in the general search result set displays a control (icon or link) for sharing the specific search result listing. The control is referred to as the Share Specific Result control herein. Selection of the Share Specific Result control for a search result in the general search result set causes the selected result to be moved from the general search result set to a separate shared results display area in each user's browser window to make it clear that that result is being shared.

Figures 6A, 6B:
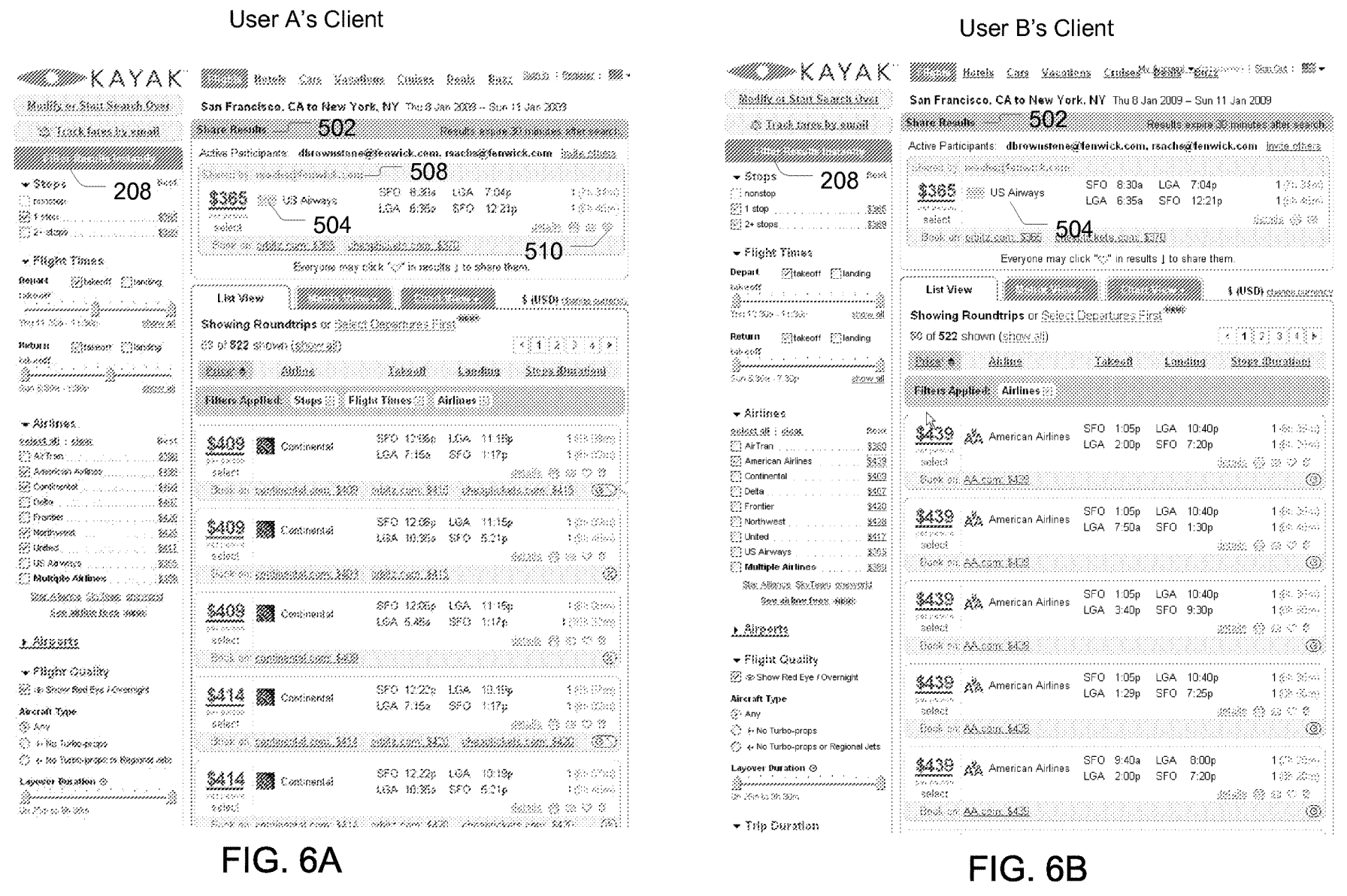

FIGS. 5A, 6A, and 6B illustrate this step. Here, in FIG. 5A a search results webpage is shown as it would appear on User A's client. The general search result set includes various results. Each of the search results in the general search result set includes an icon or other user interface element that serves as the Share Specific Result control; here a "heart" icon 506 is used, though any other icon or text could be used. In this example, User A has clicked on the heart icon 506 for the first search result 504, a $365 flight on US Airways leaving SFO at 8:30 am. In FIG. 6A, it is shown that this search result 504 has been moved from the general search results set to the Share Results panel 502 on User A's client. The search result 504 includes in section 508 the user name or email address of the user that shared the result, so that each user can see which results he shared and which results were shared by others. In this example, section 508 indicates that "rsachs@fenwick.com" shared the search result 504. FIG. 6B illustrates that User B's client is updated to also move the search result 504 to the Share Results panel 502.

In one embodiment, to update the shared results in this manner, the travel search engine maintains a list of all of the users who are currently attached to the current search session. For each of the users, the travel search engine maintains both a shared session state with the shared results, and a separate session state with the general search results and the particular user's filtering and sorting preferences applied thereto. The travel search engine constructs a webpage for each user's client based on the shared results and the general search results with any filter/sort setting selected by the user. The travel search engine is not providing the same webpage of results to each user's client, but is rather creating a specific webpage for each user from the particular user's stored search and session data. This gives each user the ability to separately and independently control and manipulate the travel search engine.

This aspect is further illustrated in FIGS. 6A and 6B. In FIG. 6A, in the shared search result selected by User A, there is shown a "broken heart" icon 510. Selection of the icon 510 removes the result from the Shared Results panel 502. The icon 510 appears only on the webpage of the user that selected the result 504 for sharing. As can be seen in FIG. 6B, the icon 510 does not appear in the shared result 504 on User B's client. Thus, User A can remove the shared result 504 from the Share Result panel 502, but User B cannot.

Also as illustrated in FIG. 6A, User A has not selected any filtering options, and thus in the list view, 522 of the 522 general search results are available. By comparison, as shown in FIG. 6B, User B has selected a number of filtering options under the Filter Results Instantly header 208. As a result, the general search results are limited to only 50 of 522. Thus, both users have access to the same general search results and the same shared results, but each user can independently filter and sort the general result search results.

This ability to be connected, with the option to maintain local refinements before pushing them to the other users, is one beneficial aspect of the invention. For example, rather than having one user as being "in control" and using collaboration to send the results to all other users, the present invention allows each user to separately and actively explore the general search results, allowing each user to identify specific results for sharing. Providing the ability for each user to selectively identify which search results to share, rather than automatically sharing all results, provides each user with the ability to selectively refine the search results (using the various filtering and sorting options set forth above) without having those refinements sent immediately to the other user(s). This selective sharing actually allows for more thorough exploration of the search results by each user, and thus is likely to lead to a better end result for both users.

Figure 7:
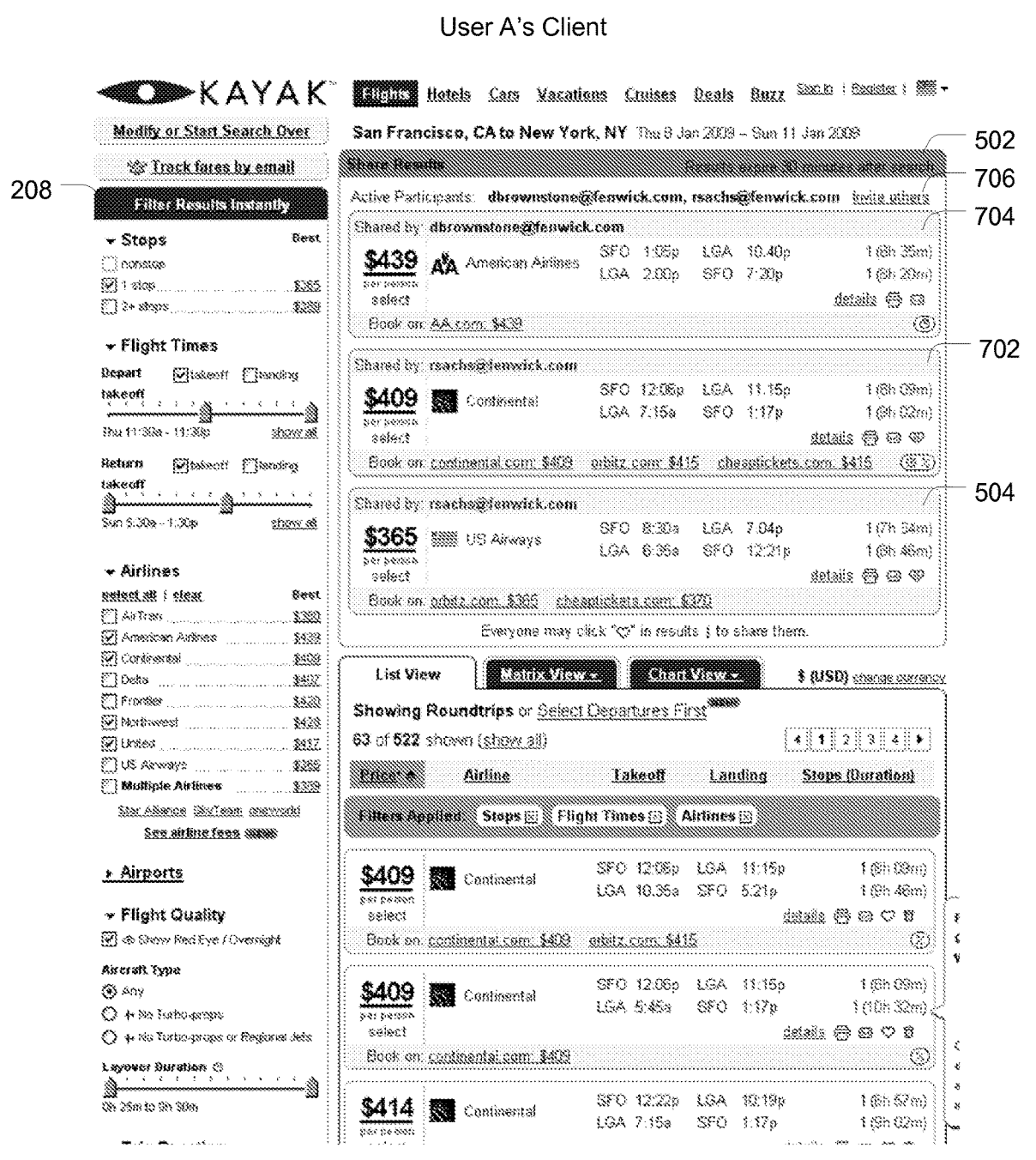

FIG. 7 illustrates this capability. Here, User A's client is shown, and User A has now added a number of additional filters (specific airlines, departure and arrival times, number of stops) under the Filter Results Instantly header 208. Additionally, User A has selected an additional result 702 (the $409 Continental flight) for sharing. This selected flight 702 is now included in the Share Results panel 502. User B has also shared a result from User B's client, the top listed shared result 704 of a $439 American Airlines flight. Note that in that shared result 704, as shown on User A's computer, there is no broken heart icon displayed. Therefore, User A cannot remove that shared result 704. Both User A and User B can continue to filter, sort and share results until a mutually acceptable result is found.

Figure 8:
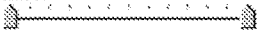

As noted above sharing is not limited to two users. In the Share Results panel 502 of FIG. 7, a link 706 is provided to "Invite others." As shown in FIG. 8, when the link 706 is selected, fields 804 and 806 are presented to the user. Field 806 is for entering the email address of an additional user with whom User A wishes to share the results with.

In an embodiment, each user can elect to share the filtering, sorting, and user preference options that are applied to their own general search results. When User A elects to share his general search results, an indication is presented by the travel search engine to User B (and any other user) in User B's browser. For example, a link such as "See all of rsachs@fenwick.com's search results" may be presented to User B. In one embodiment, when User B selects this link, the filtering and sorting operations that User A has selected are applied to User B's general search results.

The application of User A's filtering and sorting operations to User's B's general search results can be done in several different ways. First, User A's operations can completely replace User B's operations, so that User B sees the same set of filtered/sorted general search results as User A. Second, a new tab can be activated in User B's browser window, within the general search result panel, that contains User A's general search results. Thus, User B can switch between his own results and User A's results. Third, User A's filter and sort operations can be conjoined with User B's filter and sort operations to provide a further narrowed set of general search results. This would include only those results that satisfied both User A and User B's filtering parameters, and then sorted accordingly. Conflicts can be resolved in favor of one of the users (e.g., User B). This approach shows the results that should be mutually acceptable to both User A and User B.

Finally, User A's filter and sort operations can be disjoined with User B's filter and sort operations to provide a further expanded set of general search results. This would include those results that satisfied either User A's or User B's filtering parameters, and then sorted accordingly. Conflicts can be resolved in favor of one of the users. This would result in allowing each user to see their results and what the other user preferred as well. All of these types of collaboration further enable the users to identify mutually acceptable search results. The travel search engine can expose a control to User B (and each other user) to allow User B to select the manner in which User A's search results are displayed.

Each search result, in both the general search result set and the shared search result set includes one or more links to a travel provider site for booking the travel reservation. These are shown as the links appearing next to "Book on:" below each search result. As can be seen, for example in FIG. 8, the "Book on:" section 808 of the search result 704 includes a "AA.com" link that can be used to book the travel reservation of the search result 704. Accordingly, User A and/or User B can click on a provider link, which results in having that user transferred to a booking page at the travel provider site, where the travel reservation of the search result can be booked.

In embodiment, once the user has left the travel search engine for this other site, the real-time collaboration does not continue to work on the travel provider site. Therefore, to collaborate at this point, traditional means of communication would have to be used, such as talking on the phone with your friend. Alternatively, the travel provider site can support a similar sharing and collaboration functionality, in which case, the URL that is coupled to the travel provider link can be activated in the browser of each user, including any additional data (e.g., cookies, preferences) that the travel search engine has for the particular user, or receives from the travel provider site.

Figure 9:
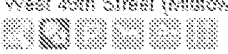
Figure 10:
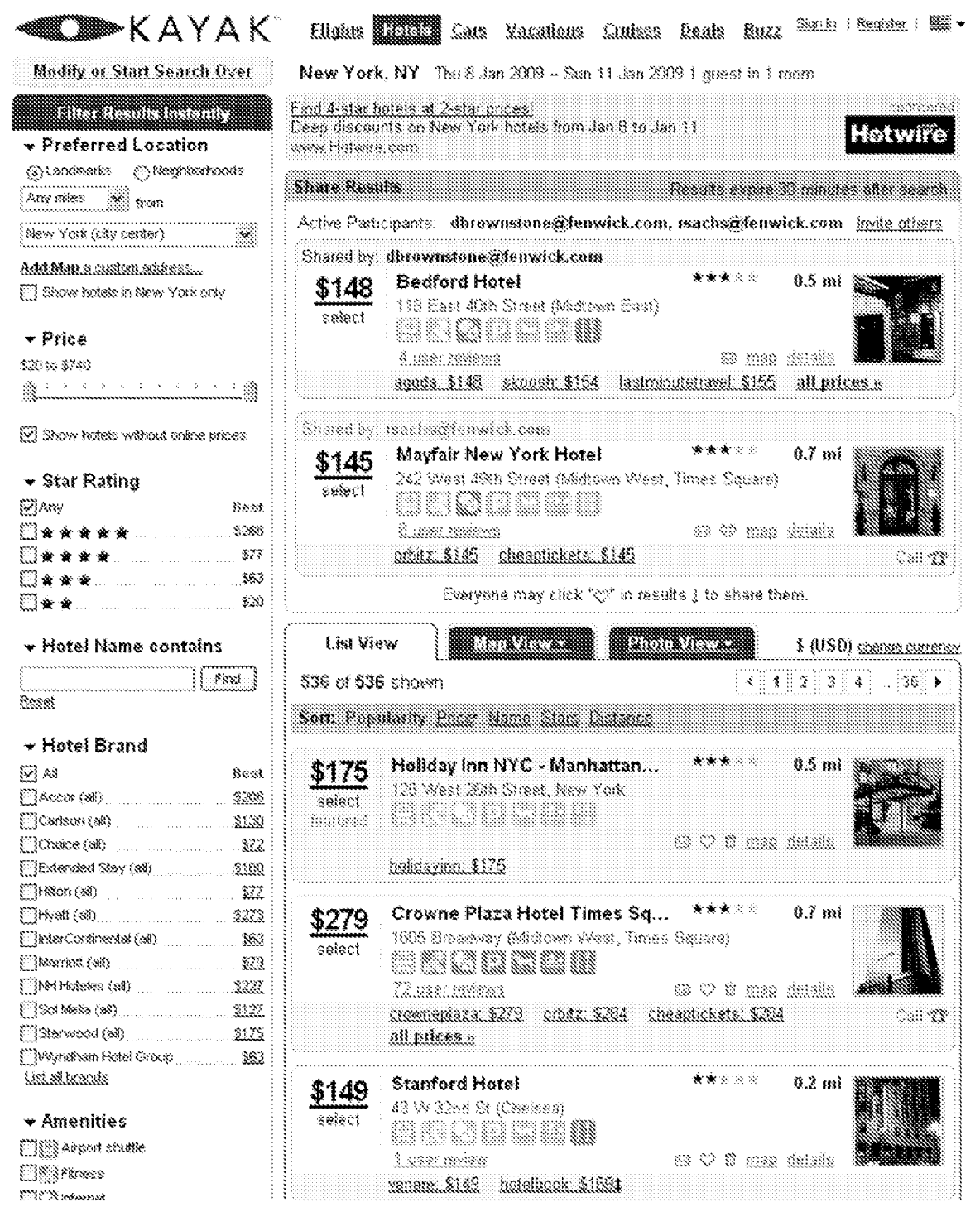

The sharing and collaboration capabilities of the travel search engine have been discussed in FIGS. 1-8 with regards to travel reservations for airline travel. However, the sharing and collaboration capabilities of the travel search engine can be used with any form of travel reservations, such as hotels, rental cars, vacations, cruises, or train travel. As an example, FIGS. 9 and 10 illustrate User A sharing search results with User B for hotel accommodations.

II. System Architecture

Figure 11:
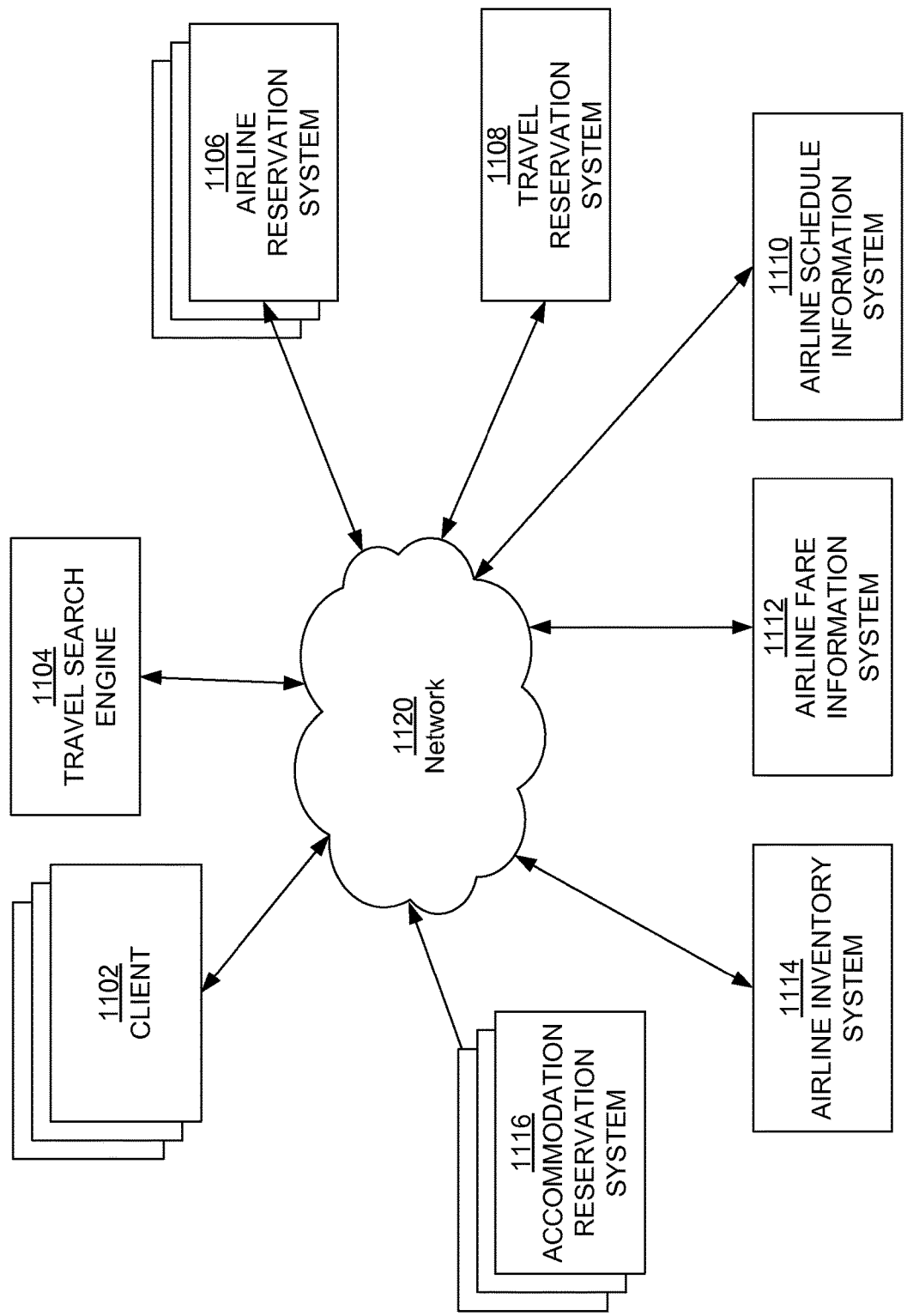
FIG. 11 is a high-level block diagram illustrating a travel search environment according to one embodiment.

FIG. 11 is a high-level block diagram illustrating a travel search environment 1100 according to one embodiment. FIG. 11 illustrates a client 1102, a travel search engine 1104, an airline reservation system 1106, a travel reservations system 1108, an airline schedule information system 1110, an airline fare information system 1112, an airline inventory system 1114, and an accommodation reservations system 1116 connected by a network 1120.

The systems of FIG. 11 represent travel information sources that the travel search engine 1104 may query based on parameters received in a search request. It should be understood that other information systems or sources with travel information can be connected to the network 1120. As used herein, the entities in FIG. 11 will be referred to as single systems, but it should be understood that a plurality of the same type of entities can be connected to the network 1120.

The client 1102 is a device used by a user to communicate with the travel search engine 1104. The user of the client 1102 communicates with the travel search engine 1104 by transmitting search requests for travel reservations to the travel search engine. The search requests transmitted to the travel search engine may be for any type travel reservation, such as flights, hotels, rental cars, cruises, and vacation packages. Each search request transmitted to travel search engine includes one or more search parameters provided by the user. The parameters included in the search request depend on the type of travel reservation being requested. For example, a request for flights may include the departing city/airport, arrival city/airport, departure date, return date, number of travelers, etc. Further, the client 1102 displays to a user search results received from the travel search engine 1104 in response to a search request.

The client 1102 can be for example, a personal computer, smart phone (e.g., iPhone, Blackberry), or other electronic device executing a web browser such as MICROSOFT INTERNET EXPLORER, MOZILLA FIREFOX, or GOOGLE CHROME. The client's web browser allows the user to retrieve and display content from web servers and other entities on the network 1120. Specifically, the client 1102 displays webpages received from the travel search engine 1104.

The travel search engine 1104 represents an entity that allows the user of the client 1102 to obtain search results from multiple travel information sources. In one embodiment, the travel search engine 1104 is provided by KAYAK SOFTWARE CORPORATION of Norwalk, Conn. In one embodiment, the travel search engine 1104 is a vertical search engine that queries multiple travel information sources in response to a search request received from the client 1102. In one embodiment, the travel search engine 1104 queries the multiple travel information sources using a type of markup language, such as hypertext markup language (HTML) or extensible markup language (XML). The travel search engine 1104 generates a webpage to include search results (i.e., general search results) received from the queried travel information sources. The travel search engine 1104 transmits the webpage to the client 1102 so that the search results can be presented to the user.

The travel search engine 1104 allows the user of the client 1102 to share the general search results with one or more other users. The travel search engine 1104 further allows the user of the client to share a specific search result within the general search result set with one or more others users. The specific result is referred to as a shared result. If the search results are being shared among multiple users, the travel search engine maintains a separate session state for each of the users. Each separate session state includes the general search results along with any filtering or sorting settings selected by the user of the separate session state. The travel search engine further maintains a shared session state for each user. Each shared session state includes shared results.

If a user of a client requests to book a travel reservation of a search result provided by the travel search engine 1104, the travel search engine 1104 transfers the client's browser to a booking webpage of a booking entity. In one embodiment, the entity is the travel information source from which the travel search engine received the search result.

The airline reservation system 1106 is a travel information source that contains airline reservation information for one or more specific airlines. In one embodiment, the airline reservation system contains information for a large number of scheduled flights in terms of schedule, pricing, and inventory. An example of an airline reservation system 206 is SABRE.

The travel reservation system 1108 is a travel information source that contains travel information and can be used by a user to book a travel reservation. The travel information system 1108 contains information on different types of travel reservations such as flights, hotels, cruises, vacation packages, and car rentals. In one embodiment, the travel reservation system 1108 is an internet based travel agency, such as TRAVELOCITY or ORBITZ. In one embodiment, if a user selects to book a travel reservation of a search result provided to the travel search engine 1104 by the travel reservation system 1108, the travel search engine 1104 directs the browser of the user's client to a webpage of the travel reservation system 1108. The travel reservation system 1108 communicates with the user to complete the booking of the reservation.

The airline schedule information system 1110 is a travel information source that contains airline schedule information for one or more airlines. An example of the schedule information contained by the airline schedule information system 1110 for each flight is departure city, departure date, departure time, arrival city, arrival date, arrival time, etc. In one embodiment, the airline schedule information system 1110 is the OFFICIAL AIRLINE GUIDE (OAG). In one embodiment, the airline reservation system 1106 and/or the travel reservation system 1108 queries the airline schedule information system 1110 to build their respective databases. In one embodiment, the airline schedule information system 1110 also includes fare information for other types of travel reservations.

The airline fare information system 1112 is a travel information source that contains airline fare information for one or more airlines. In one embodiment, the airline fare information system 1112 is the AIRLINE TARIFF PUBLISHING COMPANY (ATPCO). In one embodiment, the airline reservation system 1106 and/or the travel reservation system 1108 query the airline fare information system 1112 to build their respective databases. In one embodiment, the airline fare information system 1112 also includes fare information for other types of travel reservations.

The airline inventory system 1114 is a travel information source that contains airline inventory information for one or more airlines. In one embodiment, the airline inventory system 1114 is AMADEUS. In one embodiment, the airline reservation system 1106 and/or the travel reservation system 1108 query the airline inventory system 1114 to build their respective databases. In one embodiment, the airline inventory system 1114 also includes inventory information for other types of travel reservations.

The accommodation reservation system 1116 is a travel information source that contains accommodation information for one or more accommodation entities. An accommodation entity may be for example, a hotel, motel, bed and breakfast, cruise, etc. For each accommodation entity, the accommodation reservation system 1116 includes information on the entities inventory and rate information.

Other embodiments of the travel search environment 1100 may include only some of the systems described above or other systems not described.

The network 1120 represents the communication pathways between the different entities connected to the network 1120. In one embodiment, the network 1120 is the Internet. The network 1120 can also utilize dedicated or private communications links that are not necessarily part of the Internet. In one embodiment, the network 1120 uses standard internetworking communications technologies and/or protocols. Thus, the network 220 can include links using technologies such as Ethernet, 802.11, integrated services digital network (ISDN), worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 1120 can include multiprotocol label switching (MPLS), transmission control protocol/Internet protocol (TCP/IP), user datagram protocol (UDP), hypertext transport protocol (HTTP), simple mail transfer protocol (SMTP), file transfer protocol (FTP), etc.

The data exchanged over the network 1120 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 12:
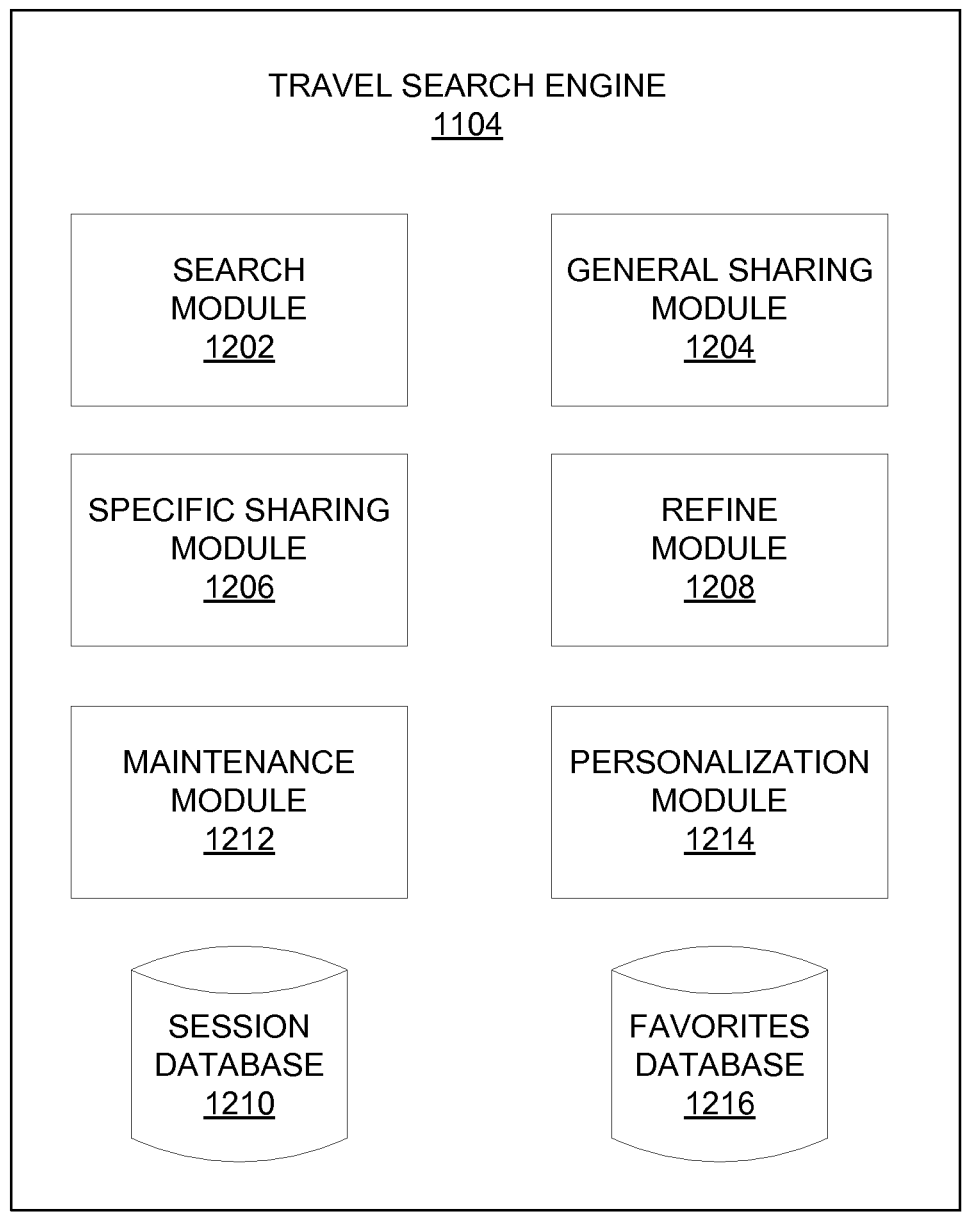
FIG. 12 is a high-level block diagram illustrating modules within the travel search engine according to one embodiment.
Figure 13A:
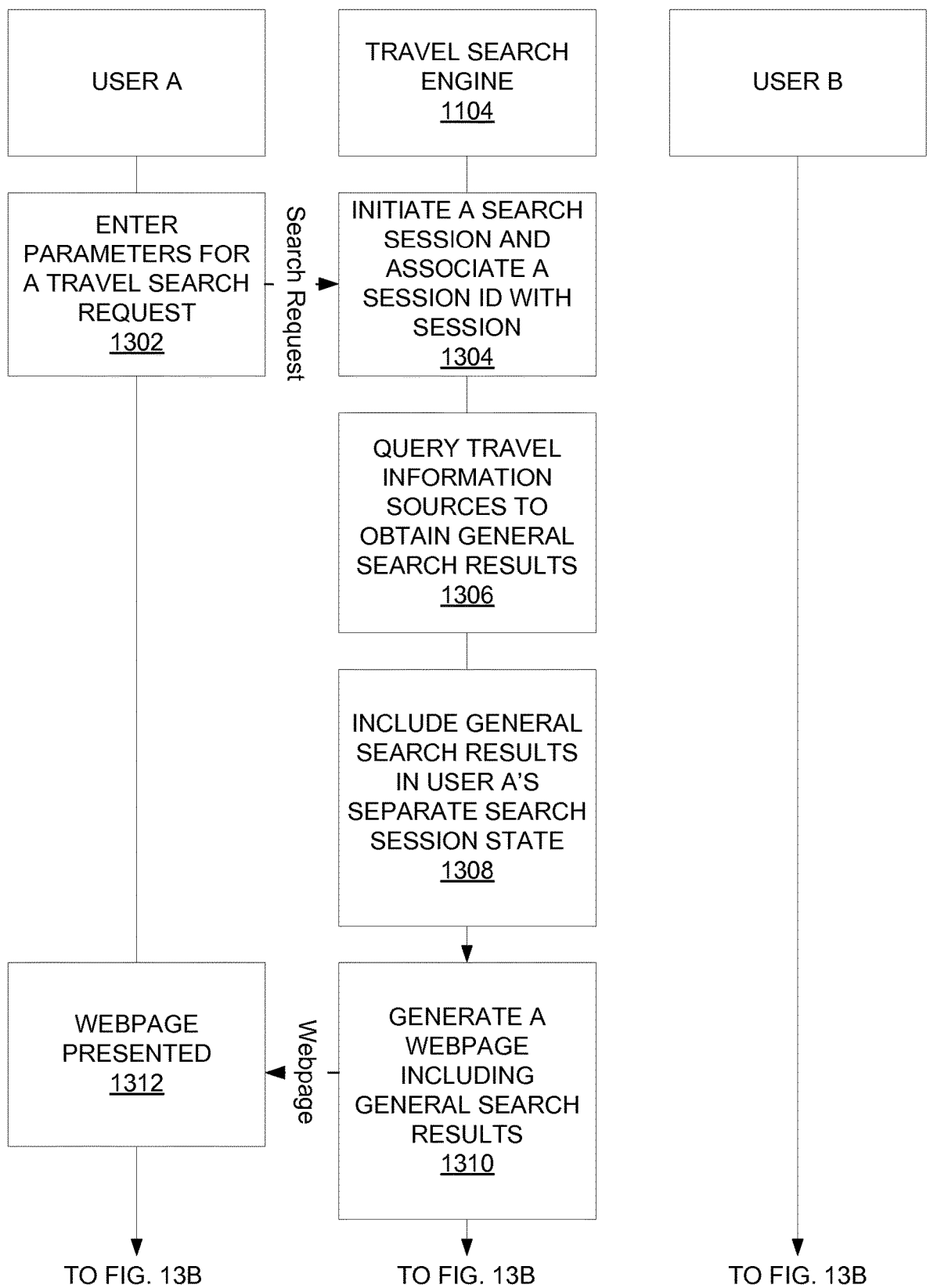
FIGS. 13A-13E are a sequence diagram illustrating the steps performed by the travel search engine in sharing search results according to one embodiment The figures depict an embodiment for purposes of illustration only. One skilled in the art will readily recognize from the following description that alternative embodiments of the structures and methods illustrated herein may be employed without departing from the principles described herein.
Figure 13B:
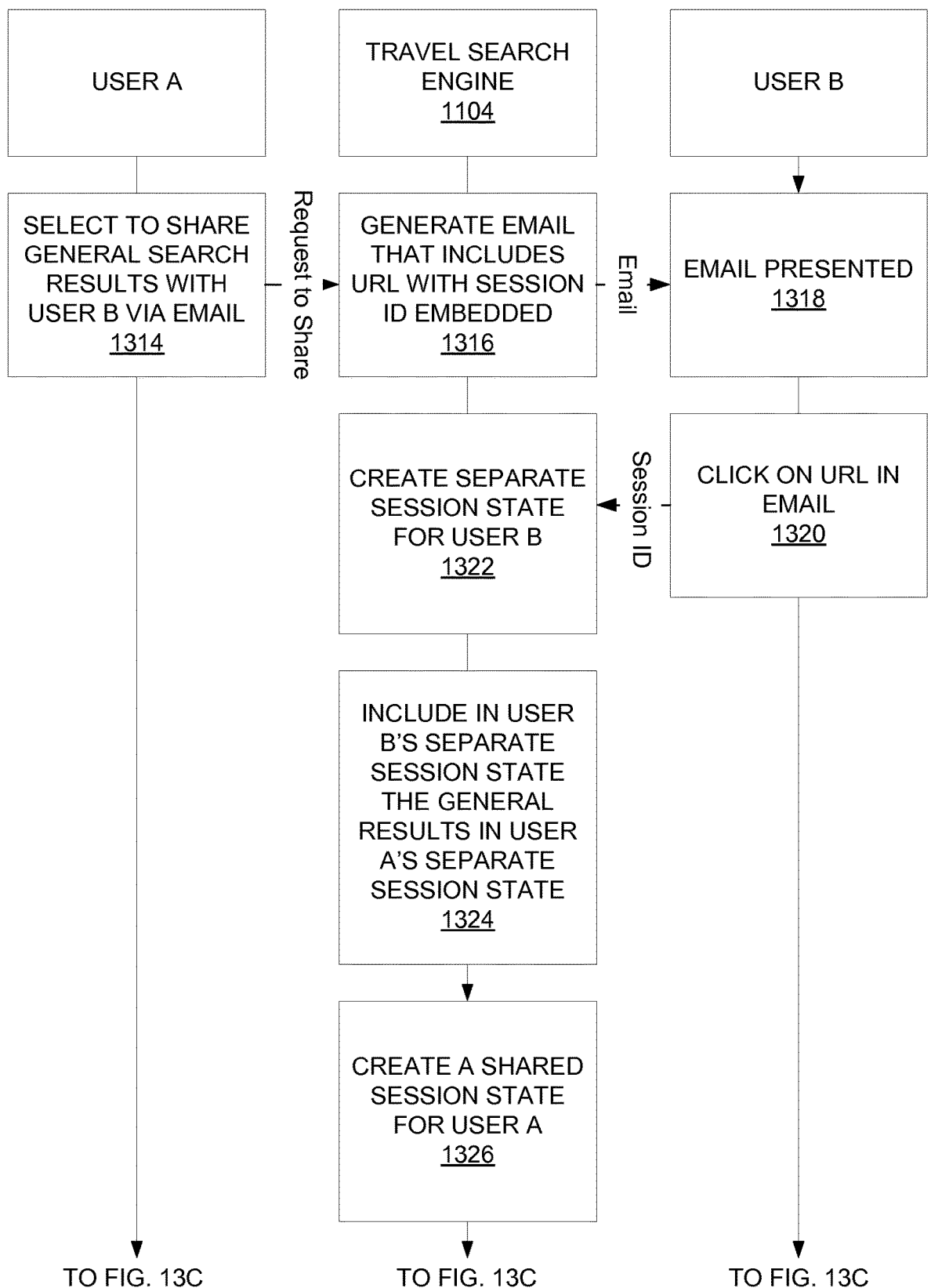
Figure 13C:
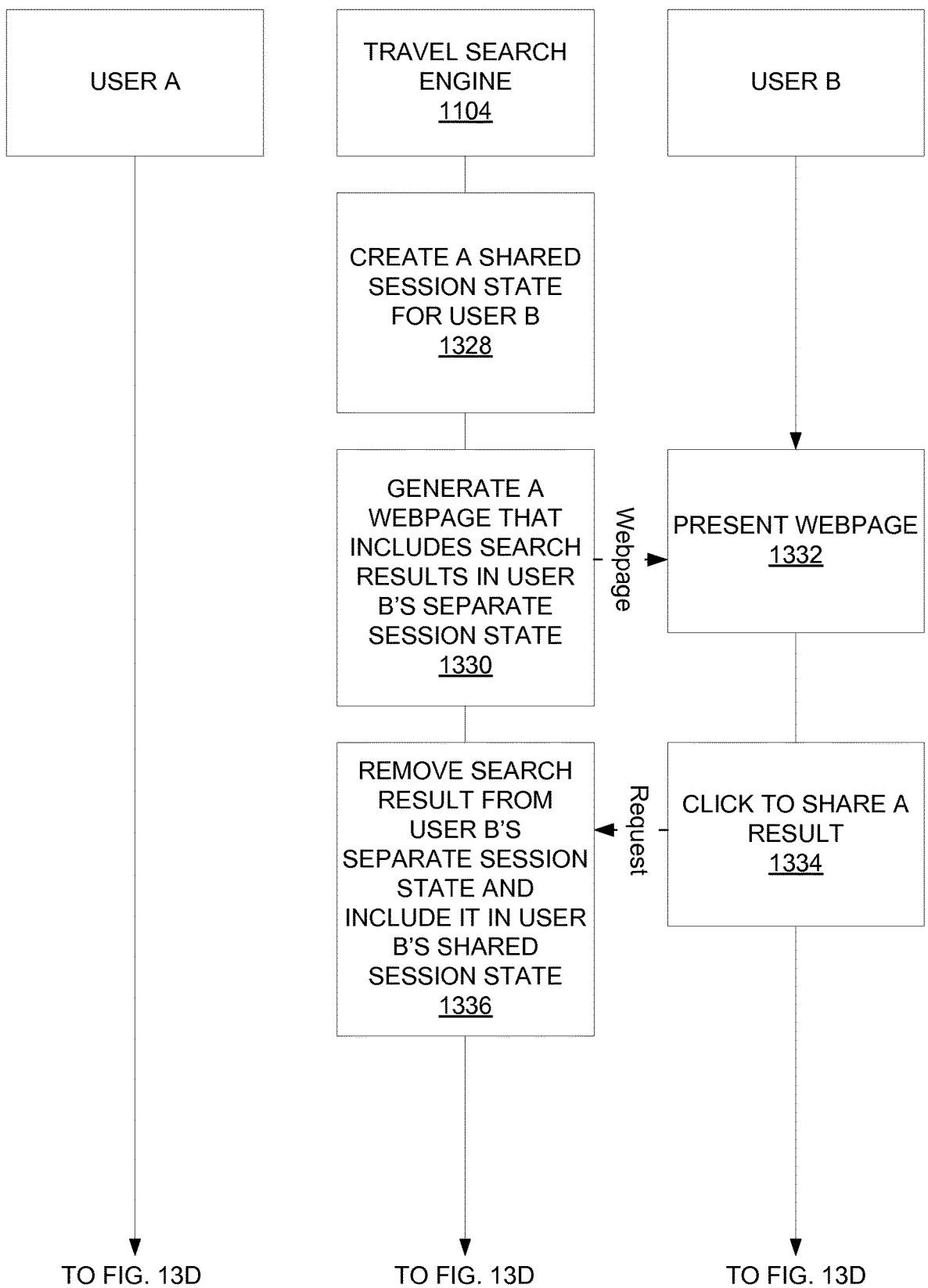
Figure 13D:
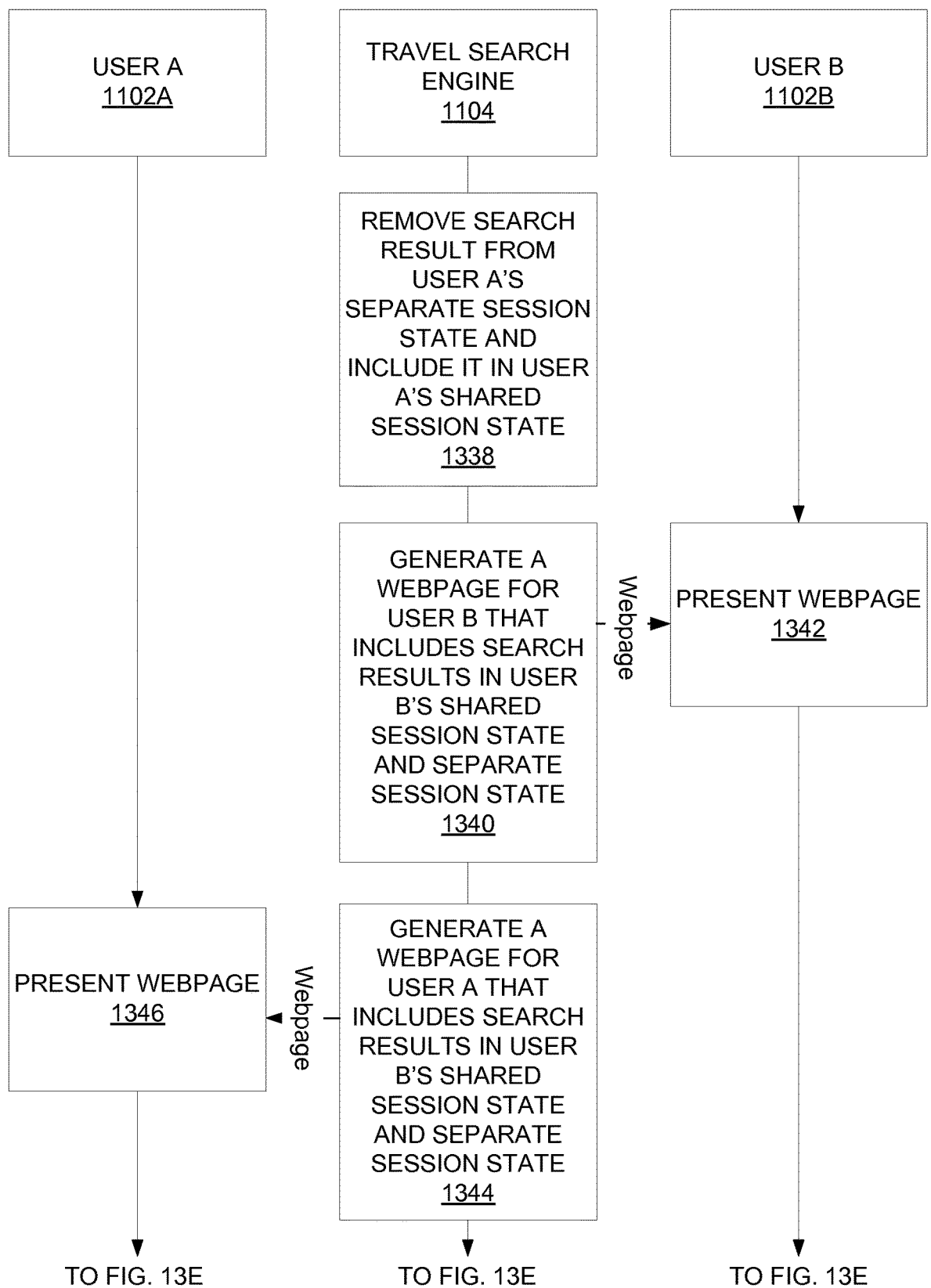
Figure 13E:
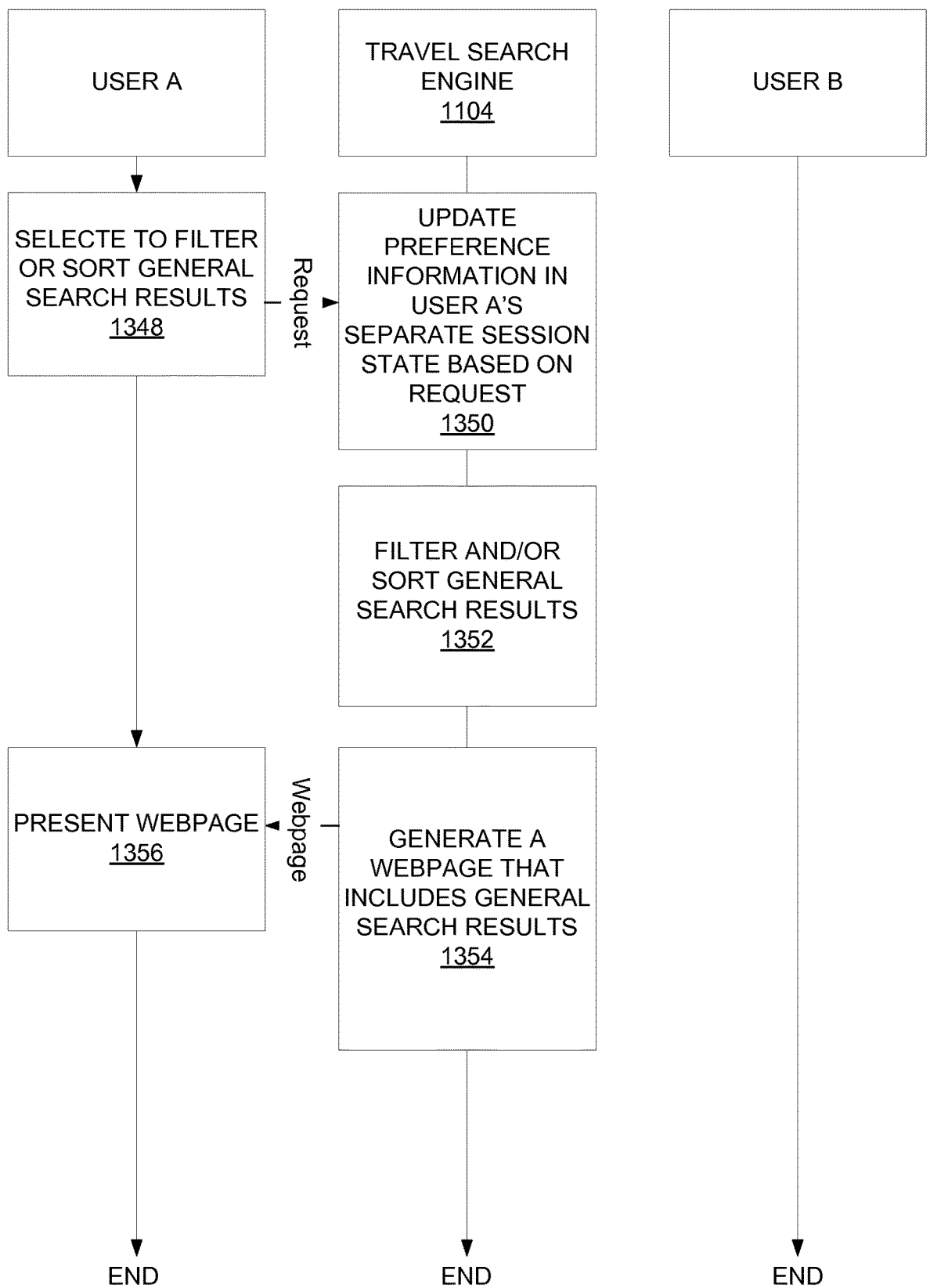

FIG. 12 is a high-level block diagram illustrating modules within the travel search engine 1104 according to one embodiment. Those of skill in the art will recognize that other embodiments can have different and/or other modules than the ones described here, and that the functionalities can be distributed among the modules in a different manner.

The travel search engine 1104 includes a search module 1202, general sharing module 1204, specific sharing module 1206, refine module 1208, maintenance module 1212, personalization module 1214, session database 1210, and favorites database 1216. The session database 1210 includes information on every search session initiated. The session database 1210 includes a search session entry for every search session initiated in response to the receipt of a search request. Associated with the search session entry is the session ID of the search session. The search session entry includes at least one separate session state that maintains general search results received from one or more travel information sources in response to a search request. Additionally, the separate session state maintains preference information that describes preferences selected by a user for refining the general search results. Specifically, the preference information describes filtering and/or sorting preferences for the general search results. The separate session state may also contain other information about the user or the user's client, such as user settings and the Internet Protocol (IP) address of the user's client.

If search results of the search session are being shared among multiple users, the search session entry maintains for each user participating in the sharing, a separate session state and a shared session state. Each separate session state within the search session entry includes the same general search results. However, depending on the filtering and/or sorting preferences selected by each user, each separate session state may include different preference information. Each shared session state includes shared results. A shared result is a result selected by a user from the general search result set for sharing with the other users participating in the search session. With each shared result, information is included as to the user that selected to share the result.

The search module 1202 executes searches for travel reservations. The search module 1202 receives search requests for travel reservations from clients. In one embodiment, a search request received by the search module 1202 includes one or more search parameters. The search parameters included in a search request depends on the type of travel reservations that are being requested. For example, travel parameters included in a search request for flight reservations may include departure city/airport, arrival city/airport, departure date, return date, and the number of travelers. On the other hand, travel parameters included in a search request for hotel reservations may include city of interest, check-in data, check-out date, number of guest, and number of rooms.

When the search module 1202 receives a search request from a client, the search module 1202 initiates a search session for the request and associates a session ID with the search session. Initiating a search session includes the search module 1202 creating a new search session entry within the session database 1210. The search module 1202 associates the session ID with the search session entry created. Within the search session entry, the search module 1202 creates a separate session state for the user of the client.

The search module 1202 selects one or more travel information sources to query in order to fulfill the search request received. The search module 1202 selects the travel information sources to query based on the search parameters of the search request and the type of travel reservations that are being requested. The search module 1202 may also use information about the user (e.g., user settings) or information about past queries to select the travel information sources to query.

The search module 1202 queries each of selected travel information sources using the search request received. In one embodiment, the search module 1202 queries the travel information sources by transmitting a query request to each of the selected travel information sources. The query request transmitted to a selected travel information source is generated by the search module 1202 based on the search request received. Therefore, the query request includes one or more parameters from the search request. Further, the query request transmitted to a selected travel information source is customized specifically for that travel information source by including the information needed by the travel information source to conduct a search.

From each queried travel information source, the search module 1202 receives search results. From the search results received, the search module 1202 selects a set of results to transmit to the client for presentation to the user. In one embodiment, the search module 1202 selects the set of search results based on one or more of the following: the price of each search result, user settings, past behavior by the user, and one or more parameters of the search request. For example, the search module 1202 may select the set to be those search results that are below a certain price. The set of results selected is referred to as the general search results or the general search result set.

The search module 1202 includes the general search results in the separate session state created for the user within the search session entry. The search module 1202 generates a webpage that includes the general search results and transmits the webpage to the client for presentation to the user. The webpage transmitted to the client includes an option to share the general search results with other users.

The general sharing module 1204 enables the sharing of general search results. The general sharing module 1204 receives requests from clients to share general search results. For purposes of clarity, the user of the client that requests to share general search results is referred to as the first user. The user with whom the general search results are shared with is referred to as the second user.

In one embodiment, a request received by the general sharing module 1204 to share general search results includes a session ID and the means by which the first user wishes to share general search result. The session ID included in the request is associated with the search session entry that includes the general search results. In one embodiment, the means by which the general search results may be shared is email or by providing the first user with a URL that provides access to the general search results. If the request is to share the general search results via email, the request also includes the email address of first user and the email address of the second user.

When the general sharing module 1204 receives a request to share the general search results, the general sharing module 1204 generates a URL that contains the session ID received in the request. The URL provides access to the general search results. It should be understood that any other type of pointer to the general search results may be used in place of the URL.

If the first user selected to share the general search results via email, the general sharing module 1204 generates an email addressed to the second user's email address and addressed as being from the first user. Within the email, the general sharing module 1204 includes the generated URL. The email may additionally include text that encourages the second user to click on the URL. The general sharing module 1204 sends the email to the second user's email address.

If the first user selected to share the general search results by receiving a URL that provides access to the general search result, the travel search engine 204 transmits the generated URL containing the session ID to the first user's client. The first user may copy the URL and provide the URL to the second user via a chat window (e.g., AIM, Yahoo Messenger, and MSN Messenger). The first user may also send an email to the second user that includes the URL.

The general sharing module 1204 receives a request from the second user's client to access the general search results when the second user provides the URL to the browser of the second user's client (e.g., by clicking on a URL link or entering the URL into the browser's address bar). The request received from the second user includes the session ID. The general sharing module 1204 identifies a search session entry in session database 1210 that is associated with the session ID. The search session entry includes the first user's separate session state, which includes the general search results. The first user's separate session state also includes preference information that describes filtering and/or sorting preferences selected by the first user for the general search results.

The general sharing module 1204 creates a separate session state for the second user within the search session entry. Within the second user's separate session state, the general sharing module 1204 includes the general search results and the preference information in the first user's separate session state. Therefore, the first user and the second user have the same general search results within their respective separate session states and at the moment have the same preference information. By creating the separate session state for the second user, the second user is now a participant in the search session.

The general sharing module 1204 further creates a shared session state for the first user and a shared session state for the second user within the search session entry. The shared session states are created for maintaining shared results. In one embodiment, the general sharing module 1204 only creates a single session state for maintaining shared results.

The general sharing module 1204 generates a webpage that includes the general search results within the second user's separate session state. The general search results included in the webpage are filtered and/or sorted if necessary according to the preference information included the second user's separate session state. The general sharing module 1204 transmits generated webpage to the second user's client for presentation.

The specific sharing module 1206 enables the sharing of specific search results. The sharing module 1206 receives requests from clients to share a specific search result from a general search result set with other users participating in a search session. In one embodiment, a request received to share a specific search result includes information that identifies the specific search result, information that identifies the user of the client, and a session ID of the search session that includes the general search result set.

When the specific sharing module 1206 receives a request from a user to share a specific search result from a general search result set with other users participating in a search session, the specific sharing module 1206 identifies a search session entry in the session database 1210 that is associated with the session ID included in the request. The specific sharing module 1206 uses the information received in the request that identifies the specific search result to locate the search result in the user's separate session state within the search session entry. The specific sharing module 1206 removes the search result from the user's separate session state and adds the search result to the user's shared session state. With the search result, the specific sharing module 1206 includes information that indicates that it was this user that selected to share the specific search result.

The specific sharing module 1206 generates a webpage for the user that includes the specific search result as a shared search result and any other result in the user's shared session state. On the webpage, the specific sharing module 1206 includes the option to stop the sharing of the specific search result. Further, the specific sharing module 1206 reads the general search results from the user's separate session state. The specific sharing module 1206 filters and/or sorts the general search results if necessary, according to preference information included in the user's shared session state. The specific sharing module 1206 includes the filtered and/or sorted general search results in the webpage. On the webpage, shared results are separated from the general search results in order to allow the shared results to stand out. The specific sharing module 1206 transmits the generated webpage to the user's client.

Additionally, for each of the other participants of the search session (i.e., users participating in the sharing of the search session's results), the specific module 1206 locates the specific search result in participant's separate session state. The specific sharing module 1206 removes the specific search result from the participant's separate session state and adds the search result to the participant's shared session state. With the search result, the specific sharing module 1206 includes information that indicates the user that selected to share the specific search result.

The specific sharing module 1206 generates a webpage for the participant that includes the specific search result as a shared result any other results in the participant's shared session state. Since the participant did not select to share the specific result, the specific sharing module 1206 does not include the option to stop the sharing of the specific result. The specific sharing module 1206 reads the general search results from the participant's separate session state. The specific sharing module 1206 filters and/or sorts the general search results if necessary, according to preference information included in the participant's separate session state. The specific sharing module 1206 includes the general search results in the webpage. The specific sharing module 1206 transmits the webpage to the participant's client.

Therefore, a webpage is presented to each participant of the search session which includes the specific search result selected as a shared result. The webpages presented to the participants are similar in that they include the same shared results. However, the general search results presented may be different because each webpage's general search results may have been filtered and/or sorted differently.

The specific sharing module 1206 receives requests from clients stop the sharing of a shared result. In one embodiment, a request received to stop the sharing of a shared result includes information that identifies the shared result and a session ID of the search session that includes the shared result.

When the specific sharing module 1206 receives a request from a client to stop the sharing of a specific shared result, the specific sharing module 1206 identifies a search session entry in the session database 1210 that is associated with the session ID included in the request. For each participant of the search session, the specific sharing module 1206 removes the shared result from the participant's shared session state and adds the result to the participant's separate session state. Therefore, the result is included in the general search result set.

The specific sharing module 1206 reads the general search results from the participant's separate session state. The specific sharing module 1206 filters and/or sorts the general search results if necessary, according to preference information included in the participant's shared session state. The specific sharing module 1206 generates a webpage that includes the general search results. If the participant's shared session state still includes one or more shared results, the shared results are included in the webpage. The specific sharing module 1206 transmits the webpage to the participant's client. Therefore, a webpage is presented to each participant of the search session which no longer reflects the specific result as a shared result and is instead included in the general search result set.

The refine module 1208 filters or sorts general search results. The refine module 1208 receives request from clients to filter or sort general search results. For example, a client may request to filter the general search results to only include search results for a certain airline or a client may request to sort the general search results based on takeoff time. In one embodiment, a request received to filter or sort general search results includes information describing the type of filtering or sorting being requested, information identifying the user of the client, and a session ID of a search session that includes the general search results.

When a user through a client requests to filter or sort general search results, the refine module 1208 identifies a search session entry in the session database 1210 that is associated with the session ID included in the request. The refine module 1208 updates preference information included in the user's separate session state within the search session entry to reflect the type of filtering or sorting that is being requested by the user.

The refine module 1208 reads the general search results from the user's separate session state. The refine module 1208 filters and/or sorts the general search results according to the preference information included in the user's separate session state. The refine module 1208 generates a webpage that includes the filtered and/or sorted general search results. If the search session entry includes a shared session state for the user and it has one or more shared results, the refine module 1208 includes the shared results in the webpage. The shared results are placed separately from the general search results on the webpage. The refine module 1208 transmits the generated webpage to the user's client for presentation.

Therefore, the filtering or sorting being requested by the user is only applied to the user's general search results. Even if the search session is being shared with other users, the other users general search results are not filtered or modified based on the request received.

A user of a client may request that filtering and sorting preferences selected by another user be applied to its respective general search result. The user making the request and the other user are participants of a search session (i.e., users sharing results of the search session). For purposes of clarity, the user making the request will be referred to as the first user. The user that selected the filtering and sorting preferences will be referred to as the second user.

When the refine module 1208 receives a request from the first user's client to have filtering and sorting preferences selected by the second user be applied to its respective general search result, the refine module 1208 identifies a search session entry associated with a session ID included in the request. The refine module 1208 reads the general search results from the first user's separate session state within the search session entry. The refine module 1208 filters and/or sorts the general search results according to preference information included in the second user's separate session state. In one embodiment, in the first user's separate session state, the refine module 1208 replaces the preference information with the preference information included in the second user's separate session state. The refine module 1208 generates a webpage that includes the filtered and/or sorted general search results. Additionally, if the first user's shared session state contains one or more shared results, the refine module 1208 includes the shared results in the webpage, separate from the general search results.

The refine module 1208 transmits the webpage to the first user's client for presentation. In one embodiment, the webpage replaces the current webpage on the browser of the first user's client. In another embodiment, the webpage is opened as a new window or tab on the browser of the first user's client.

The first user may also request that its filtering and sorting preferences be conjoined or disjoined with the filtering and sorting preferences of the second user. When the refine module 1208 receives a request from the first user's client to conjoin or disjoin its filtering and sorting preferences with those of the second user, the refine module 1208 identifies a search session entry in the session database 1210 associated with a session ID included in the request. The refine module 1208 reads the general search results from the first user's separate session state. The refine module 1208 additionally reads the preference information of the first user and the second user from their respective separate session states. The refine module 1208 uses the read preference information to filter and/or sort the general search result set.

If the first user requested to conjoin the filtering and sorting preferences, the refine module 1208 filters and sorts the general search result set so that the set only includes general search results that satisfy the filtering and sorting preferences of the first user and the second user. In embodiment, conflicts between the preferences are resolved in favor of the first user's preferences. In another embodiment, conflicts between the preferences are resolved in favor of the second user's preferences. In one embodiment, the refine module 1208 updates the preference information in the first user's separate session state to reflect the conjunction of first user's preferences and the second user's preferences.

If the first user requested to disjoin the filtering and sorting preferences, the refine module 1208 filters and sorts the general search result set so that the set only includes general search results that satisfy the filtering and sorting preferences of the first user or the second user. In one embodiment, the refine module 1208 updates the preference information in the first user's separate session state to reflect the disjunction of first user's preferences and the second user's preferences.

The refine module 1208 generates a webpage that includes the filtered and/or sorted general search results. The refine module 1208 transmits the webpage to the first user's client. In one embodiment, the webpage replaces the current webpage on the browser of the first user's client. In another embodiment, the webpage is opened as a new window or tab on the browser of the first user's client.

The maintenance module 1212 updates general search results of each search session initiated by the search module 1202. For each search session entry in the session database 1210, the maintenance module 1212 tracks the amount of time that has passed since the search module 1202 received the general search results in the search session entry from one or more travel information sources. After a certain amount of time (e.g., 15 minutes), the maintenance module 1212 identifies the general search results as being expired.

The general search results are identified as being expired because travel reservations are constantly changing in terms of price, availability, itinerary, etc. Therefore, after a certain amount of time, the information of the general search results cannot be trusted to be accurate. For example, a search result for a flight may be at a certain price. However, ten minutes later the price for the flight may be increased due to less seats being available on the flight. In one embodiment, the maintenance module 1212 identifies only a subset of the general search results as being expired. For example, only general search results received from a specific travel information source may be identified as expired after a certain amount of time.

In one embodiment, if the maintenance module 1212 identifies the general search results as being expired, the maintenance module 1212 presents the user of the search session with the option of having the general search results updated with the latest available information. In one embodiment, if the general search results are being shared between two or more users, the maintenance module 1212 presents the option only to the user that submitted the search request to initiate the search session. In another embodiment, the maintenance module 1212 presents the option to each user participating in the sharing.

If a user selects to have the general search results updated, the maintenance module 1212 sends a request to the search module 1202 for a new search to be performed using the search request of the search session. In one embodiment, the maintenance module 1212 automatically sends the request to the search module 1202 once it is determined that the general search results are expired. Therefore, in this embodiment, a user is not presented with the option of having the general search results updated because the updating occurs automatically.

Once the search module 1202 has queried one or more travel providers and identified a new set of general search results, the maintenance module 1212 replaces the general search results currently in the search session entry. To replace the general search results currently in the search session entry, the maintenance module 1212 identifies each separate session state in the search session entry. For each user's separate session state, the maintenance module 1212 replaces the general search results currently in the separate session state with the new general search results.

If the user also has a shared session state, meaning that the general search results are being shared, the maintenance module 1212 determines whether the one or more shared search results in the shared session state are included in the new general search results. If a shared search result is not included in the new general search result set, it signifies that the shared search result is no longer available. Therefore, the maintenance module 1212 removes the shared search result from the shared session state. In one embodiment, if a shared search result is included in the new general search result, but information of the search result has changed (e.g., the price), the maintenance module 1212 updates the information of the shared search result with the current information. The maintenance module 1212 removes from the user's separate session state, any search result that is maintained in the user's shared session state.

For each user participating in the search session, the maintenance module 1212 reads the search results from the user's separate session state. The maintenance module 1212 filters and/or sorts the search results according to the preference information included in the user's separate session state. The maintenance module 1212 generates a webpage that includes the filtered and/or sorted search results. If the search session entry includes a shared session state for the user and it has one or more shared results, the maintenance module 1212 includes the shared results in the webpage. The maintenance module 1212 transmits the generated webpage to the user's client for presentation. In one embodiment, the generated webpage indicates the search results that have been removed as a result of the updating by for example having the removed search results grayed out.

The maintenance module 1212 may use a variety of different mechanisms in order to determine when to update the search results, and which search results to update. In addition, or instead of, to using a timer to determine which results have expired, the maintenance module 1212, can use predictive models (e.g., decision trees, neural networks, support vector machines, logistic regression, AdaBoost, Bagging, NaiveBayes, nearest neighbors, regularized regression, and others) to predict for each search result the length of time to maintain the result before updating the search. The model would be trained on historical data (e.g., prior result and information indicating how long each such result was valid) and optimized for future predictive accuracy.

The favorites database 1216 maintains information on user's of the travel search engine 1104. In one embodiment, the favorites database 1216 only maintains information on user's who have registered with the travel search engine 1104. For each user, the favorites database 1216 includes search results that the user has identified as being favorites. In one embodiment, the information in the favorites database 1216 is used to sort search results presented to a user. The search results are sorted so that the search results that are the most similar to the user's favorites are presented first.

The personalization module 1214 updates the favorites database 1216. In one embodiment, when a webpage is presented to a user with a set of search results, the user may request to save a specific search result within the set as a favorite. When a user makes such a request, the personalization module 1214 searches for the user in the favorites database 1216 and adds the search result to the user's favorites.

In one embodiment, the personalization module 1214 searches the favorites database 1216 upon receiving a search query from an administrator of the travel search engine 1104. The personalization module 1214 provides the administrator with search results consisting of users whose favorites are related to the search query. The functionality of the personalization module 1214 is beneficial for marketing purposes. For example, assume an administrator is interested in marketing a certain flight and provides the personalization module 1214 with a search query consisting of the flight's information (e.g., airline, departure city, arrival city). The personalization module 1214 identifies users who have one or more favorites that are similar to the flight. Since the flight is similar to their favorites, the users will more than likely be interested in the flight. An email can then be sent to each of the identified users promoting the flight.

The personalization module 1214 may use ruled-based, machine-learning based, hybrid methods of both rule-based and machine learning based, collaborative filtering, or other artificial intelligence methods to establish a user's favorites. These approaches can be based on historical observations of which search results (and their attributes) that a user has previously saved, as well as analysis of the user's similarity to other users.

III. Process

FIGS. 13A-13E are a sequence diagram illustrating the steps performed by the travel search engine 1104 in sharing search results according to one embodiment. Those of skill in the art will recognize that other embodiments can perform the steps of FIGS. 13A-13E in different orders. Moreover, other embodiments can include different and/or additional steps than those ones described here.

This sequence diagram is described with respect to sharing search results between User A and User B. Initially, in FIG. 13A, User A enters 1302 search parameters for a travel search request. The search request is transmitted by User A's client to the travel search engine 1104. The travel search engine 1104 initiates 1304 a search session and associated a session ID with the search session. Initiating a search session includes the travel search engine 1104 creating a separate session state for User A within the search session. The travel search engine 1104 queries 1306 one or more travel information sources to obtain general search results. The travel search engine 1104 includes 1308 the general search results in User A's separate session state. The travel search engine generates 1310 a webpage that includes the general search results and transmits the webpage to User A's client. The webpage is presented 1312 to User A.

User A selects 1314 to share the general search results with User B via email. In response to the selection, a request to share is transmitted from the User A's client to the travel search engine 1104. The travel search engine 1104 generates 1316 an email that includes a URL that provides access to the general search results. The session ID of the search session is embedded in the URL. The generated email is addressed to User B's email address and is addressed as being from User A's email address. The travel search engine transmits the email to User B. The email is presented 1318 to User B. User B clicks 1320 on the URL included in the email. In response to User B clicking on the URL, a request for access to the general search results is transmitted from User B's client to the travel search engine 1104. The request includes the session ID of the search session.

In response to the request, the travel search engine 1104 creates 1322 a separate session state for User B within the search session. The travel search engine 1104 includes 1324 in User B's separate session state the general search results and preference information included in User A's session state. The travel search engine 1104 creates 1326 a shared session state for User A in the search session. Additionally, the travel search engine 1104 creates 1328 a shared session state for User B. The travel search engine 1104 generates 1330 a webpage that includes the search results in User B's separate session state. The search results included in the webpage are filtered and sorted according to the preference information included in User B's separate session state. The travel search engine transmits the webpage to User B's client. The webpage is presented 1332 to User B.

User B clicks 1334 to share a specific result within the general search result set. A request to share the specific result is transmitted by User B's client to the travel search engine 1104. The travel search engine 1104 removes 1336 the search result from User B's separate session state and includes it in User B's shared session state as a shared result. The travel search engine 1104 includes information with the search result indicating that User B selected to share the result. The travel search engine 1104 removes 1338 the search result from User A's separate session state and includes it in User A's shared session state. The travel search engine 1104 includes information with the search result indicating that User B selected to share the result.

The travel search engine 1104 generates 1340 a webpage for User B that includes the shared results within User B's shared session state. For the specific result selected by User B, an option is included in the webpage to allow User B to stop the sharing of the result. The travel search engine 1104 also includes in the webpage the general search results within User B's separate session state. The general search results included in the webpage are filtered and sorted according to the preference information included in User B's separate session state. The travel search engine 1104 transmits the webpage to User B's client and the webpage is presented 1342 to User B.

The travel search engine 1104 generates 1344 a webpage for User A that includes the shared results within User A's shared session state. Unlike in the webpage of User A, no option is included in User B's webpage to stop the sharing of the specific search result selected by User B. The travel search engine 1104 also includes in the webpage the general search results within User A's separate session state. The general search results included in the webpage are filtered and sorted according to the preference information included in User A's separate session state. The travel search engine 1104 transmits the webpage to User A's client and the webpage is presented 1346 to User A.

User A selects 1348 to filter or sort the general search results. User A's client transmits a request to travel search engine 1104 including information describing the type of filtering or sorting selected by the user. The travel search engine 1104 updates 1350 the preference information in User A's separate session state to reflect the type of filtering or sorting being requested by User A. The travel search engine 1104 reads the general search results from User A's separate session state and filters and/or sorts 1352 the results according to the preference information included in User A's separate session state.

The travel search engine 1104 generates 1354 a webpage that includes the filtered and/or sorted general search results. The travel search engine 1104 additionally includes in the webpage the one or more shared results in User A's shared session state. The travel search engine transmits the webpage to User A's client and the webpage is presented 1356 to User A.

The present invention has been described with respect the collaboration and sharing of search results for travel reservations. However, it should be understood that the present invention can be used to share any type of search results. For example, the invention may be used to share results for tangible items, such as books, cameras, television, etc. The invention may also be used to share results of information crawled on the internet, such as websites, articles, videos, music, etc.

The present invention provides various benefits over existing systems for sharing and collaboration of online hosted content. Generally, general purpose "screen sharing" programs are used for collaboration, but these programs require each user to install a specific client application on their computers other than just their standard Internet browser. For example, WebEx is a popular collaboration program and service. The screen sharing applications are inefficient since the collaboration program does not have semantic understanding of the website in use. Thus, when travelers use WebEx (or similar) with an existing travel search engine, only one user is actually attached to the travel search engine, and any interaction they have with travel search engine will result in redisplaying their screen on both computers. Thus, other users do not have the ability to independent explore the search results at the same time as the user who is accessing the travel search engine. In sum, these system only "share" the most superficial layer of presentation, the graphical screen image itself.

By contrast, the present invention maintains the result set content separately for each user, and each user can have separate control of his/her analysis tools, (e.g., filterers, sorting, etc). Whereas the screen collaboration applications enforce one single state, on the primary user's computer, the present invention maintains independent states for each of the sharing users. Screen sharing applications allow only one user, at a time, to control the input to the application (there is one single instance of screen, mouse, keyboard, and therefore browser state); the remaining users are typically locked out of controlling the application, and must request control. In contrast, with the present invention each user is in control of his/her own screen, input devices, and browser, and can interact with the travel search engine without obtaining permission or control from another user, and without interfering with such other user's interactions with the application. Screen sharing applications result in one single user session stored on the server side, while with the present invention, for each user there is maintained both a separate session state, and a shared session state, stored by the travel search engine system.

Other web-based collaboration document editing tools are known such as Google Documents, but these programs are not attached to a vertical search engine which can query additional websites as a response to each user sort or filter request. The present invention is different from collaborative editing tools in the following ways. First, the collaborative editing tools maintain a single state of the document, or the aggregate of the joint editing, and pending changes to be integrated. To maintain state at the host system, each user must proactively save the document, since any changes made in the user's browser are only locally available until the document is saved. Embodiments of the present invention maintains on host server of the travel search engine both a separate session state for each user, and shared session state, which allows the users to keep integrating shared results, or split to separate search activities, without having to proactively save their own version of the state. Maintaining the state for each user allows each user to interact with the travel search engine to further explore the search results. Because the search collaboration of the present invention can also maintain the user specific result set, each time a new user is added, they may start from a different default result set, due to personal preference, or result set personalization determined by the server side. In a web based collaborative editing scenario, each user has to start with the same version of the shared document, because there can be no personalization. Thus, the present invention takes advantage of the vertical specific knowledge to facilitate the collaborative discovery.

Finally, there are content management systems that allow users to share documents, check out versions of those documents asynchronously, and reintegrate their changes. Content management systems maintain only the integrated state on the server side, and each client maintains its own user state. When a client checks in content, the content management system must resolve conflicts between different versions of the user content. The present invention is different from such systems in that each collaborating user can continuously branch out of the collaboration state, and reintegrate results, or state without the need for user managed conflict resolution. This is a further beneficial result of the travel search engine maintaining both the shared, and the individual states on the server. The present invention allows integrating without user driven conflict resolution, while at the same time allowing each user to explore results with a separate state.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable storage medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
   obtaining, by a computing device and for a search session, a set of search results;
   creating, for a first user, a first session state of the search session;
   creating, for a second user, a second session state of the search session;
   causing a first presentation, at a first computing device associated with the first user, of the set of search results;
   causing a second presentation, at a second computing device associated with the second user, of the set of search results;
   based on receiving a first refinement of the first presentation of the set of search results, updating the first session state based on the first refinement and not updating the second session state based on the first refinement; and based on receiving a second refinement of the second presentation of the set of search results, updating the second session state based on the second refinement and not updating the first session state based on the second refinement.

2. The method of claim 1, further comprising:
receiving, from the first user, a request to share, with the second user, the set of search results; and
wherein the second session state is created based on the request to share the set of search results.

3. The method of claim 1, further comprising:
receiving, from the first user, an indication of a search result in the set of search results to share with the second user; and
updating the second session state based on the indication of the search result to share with the second user.

4. The method of claim 3, further comprising:
causing, at the second computing device, the search result to share with the second user to be presented in a first portion of a graphical user interface of the second computing device that is separate from a second portion of the graphical user interface, wherein the second portion of the graphical user interface is configured to present the set of search results.

5. The method of claim 1, further r comprising:
receiving, from the first user, an indication of a search result in the set of search results to share with the second user; and
causing, at the first computing device, the search result to be moved from a first portion of a graphical user interface of the first computing device to a second portion of the graphical user interface, wherein the first portion of the graphical user interface is configured to present the set of search results, and wherein the second portion of the graphical user interface is configured to present the search result to share with the second user.

6. The method of claim 1, further comprising:
receiving, from the first user, a request to share, with the second user, a third refinement of the first presentation of the set of search results;
determining a refined set of search results based on the third refinement; and
causing, at the second computing device, a third presentation of the refined set of search results.

7. The method of claim 1, wherein:
at least one of the first refinement or the second refinement comprises at least one of:
a filtering of the set of search results;
a sorting of the set of search results; or
an application of a preference to the set of search results.

8. The method of claim 1, wherein the set of search results comprises a set of travel search results.

9. The method of claim 1, wherein the set of search results comprises a plurality of search results.

10. A system comprising:
one or more processors; and
memory storing instructions that, when executed by the one or more processors, cause the system to:
obtain, for a search session, a set of search results;
create, for a first user, a first session state of the search session;
create, for a second user, a second session state of the search session;
cause a first presentation, at a first computing device associated with the first user, of the set of search results;
cause a second presentation, at a second computing device associated with the second user, of the set of search results;
based on receiving a first refinement of the first presentation of the set of search results, update the first session state based on the first refinement and not update the second session state based on the first refinement; and
based on receiving a second refinement of the second presentation of the set of search results, update the second session state based on the second refinement and not update the first session state based on the second refinement.

11. The system of claim 10, wherein:
the instructions, when executed, further cause the system to receive, from the first user, a request to share, with the second user, the set of search results; and
wherein the second session state is created based on the request to share the set of search results.

12. The system of claim 10, wherein:
the instructions, when executed, further cause the system to:
receive, from the first user, an indication of a search result in the set of search results to share with the second user; and
update the second session state based on the indication of the search result to share with the second user.

13. The system of claim 10, wherein:
the instructions, when executed, further cause the system to cause, at the second computing device, the search result to share with the second user to be presented in a first portion of a graphical user interface of the second computing device that is separate from a second portion of the graphical user interface, wherein the second portion of the graphical user interface is configured to present the set of search results.

14. The system of claim 10, wherein:
the instructions, when executed, further cause the system to:
receive, from the first user, an indication of a search result in the set of search results to share with the second user; and
cause, at the first computing device, the search result to be moved from a first portion of a graphical user interface of the first computing device to a second portion of the graphical user interface, wherein the first portion of the graphical user interface is configured to present the set of search results, and wherein the second portion of the graphical user interface is configured to present the search result to share with the second user.

15. The system of claim 10, wherein:
the instructions, when executed, further cause the system to:
receive, from the first user, a request to share, with the second user, a third refinement of the first presentation of the set of search results;
determine a refined set of search results based on the third refinement; and
cause, at the second computing device, a third presentation of the refined set of search results.

16. The system of claim 10, wherein:
at least one of the first refinement or the second refinement comprises at least one of:

a filtering of the set of search results;
a sorting of the set of search results; or
an application of a preference to the set of search results.

17. The system of claim 10, wherein the set of search results comprises a set of travel search results.

18. The system of claim 10, wherein the set of search results comprises a plurality of search results.

19. A method comprising:
obtaining, by a computing device and for a search session shared between a plurality of users, a set of search results;
creating, for the plurality of users, a plurality of general search session states of the search session, wherein the plurality of general search session states each indicate the set of search results, and wherein each individual general search session state of the plurality of general search session states is respectively associated with a corresponding user of the plurality of users;
creating a shared session state of the search session, wherein the shared session state indicates one or more search results of the set of search results that have been selected to share with the plurality of users;
causing respective presentations, at a plurality of computing devices respectively associated with the plurality of users, of the set of search results, wherein the set of search results is presented, at each computing device of the plurality of computing devices, in a first portion of a graphical user interface of the computing device; and
causing respective presentations, at the plurality of computing devices, of the one or more search results that have been selected to share with the plurality of users, wherein the one or more search results are presented, at each computing device of the plurality of computing devices, in a second portion of the graphical user interface that is separate from the first portion of the graphical user interface.

20. The method of claim 19, further comprising:
receiving, from a user of the plurality users, an indication of a search result in the set of search results to share with at least one other user of the plurality of users; and
causing, at a computing device of the plurality of computing devices that is associated with the user, the search result to be moved from the first portion of the graphical user interface to the second portion of the graphical user interface.

\* \* \* \* \*